United States Patent [19]
Takahashi et al.

[11] Patent Number: 5,752,866
[45] Date of Patent: May 19, 1998

[54] LUBRICATION AND CRANKCASE VENTILATING SYSTEM FOR FOUR-CYCLE OUTBOARD MOTOR

[75] Inventors: Masanori Takahashi; Hitoshi Watanabe, both of Hamamatsu, Japan

[73] Assignee: Sanshin Kogyo Kabushiki Kaisha, Hamamatsu, Japan

[21] Appl. No.: 693,794

[22] Filed: Jul. 31, 1996

[30] Foreign Application Priority Data

Aug. 3, 1995 [JP] Japan .................................. 7-198876
Aug. 3, 1995 [JP] Japan .................................. 7-198886
Aug. 3, 1995 [JP] Japan .................................. 7-198887

[51] Int. Cl.$^6$ ........................................ B63H 21/10
[52] U.S. Cl. .................... 440/88; 440/900; 123/195 HC
[58] Field of Search .................... 440/88, 89, 900; 123/41.86, 50 A, 57 A, 56.9, 195 P, 195 HC

[56] References Cited

U.S. PATENT DOCUMENTS 4,828,519  5/1989  Watanabe ........................ 440/88
5,069,192  12/1991  Matsumoto et al. ............. 123/41.86
5,476,402  12/1995  Nakai et al. ..................... 440/89

*Primary Examiner*—Jesus D. Sotelo
*Attorney, Agent, or Firm*—Knobbe, Martens, Olson & Bear LLP

[57] ABSTRACT

An outboard motor having a high-performance V-type twin overhead cam four-cycle internal combustion engine. The oil reservoir for the engine is disposed in a driveshaft housing below the engine and an oil pump is driven off the lower end of the engine crankshaft for circulating the oil from the oil tank to the engine. The oil supply system for the engine includes a vertically extending main gallery and a drain passage which extend in parallel side-by-side relationship and which are disposed over the oil tank for ease of oil return. The exhaust and cooling system for the engine is configured so as to minimize heat transfer between the exhaust system and the lubricating system and to maintain a compact assembly. The engine has an improved oil reservoir and crankcase ventilating system.

21 Claims, 23 Drawing Sheets

LUBRICATION AND CRANKCASE VENTILATING SYSTEM FOR FOUR-CYCLE OUTBOARD MOTOR

BACKGROUND OF THE INVENTION

This invention relates to a lubricating and crankcase ventilating system for an internal combustion engine and more particularly to such systems for a four-cycle outboard motor.

It is well known that the utilization of internal combustion engines as the power plant for outboard motors presents many unique problems in engine design. Because of the compact nature required for the propulsion unit and the fact that the engine crankshaft generally rotates about a vertically extending axis in an outboard motor, this application presents certain design obstacles.

Conventionally, outboard motors have utilized two-cycle crankcase compression engines are their propulsion devices. The two-cycle engine lends itself to such applications because of the simplicity of the engine, the high specific power output and the lack of a recirculating lubricating system.

However, these same advances of two-cycle engines for outboard motor application have attendant with them certain disadvantages which are mitigating against the continued use of such engines for this purpose. Primarily, the fact that any excess lubricant from a two-cycle engine is passed with the exhaust gases to the atmosphere makes this type of propulsion unit less desirable for environmental reasons. This is particular true since the exhaust gases are normally passed through the body of water in which the outboard is operating so as to assist in the silencing and cooling of the exhaust gases. Thus, any oil which may be present in the exhaust gases may tend to pollute, not only the atmosphere, but also the body of water.

For these environmental reasons and because of the fact that two-cycle engines tend to operate over a narrower effective power range, the utilization of four-cycle engines is receiving renewed interest. Because four-cycle engines employ recirculating lubricating systems, the potential loss of lubricant to the atmosphere and/or the body water in which the watercraft is operating is minimized. However, there are a number of problems in connection with the design of lubricating systems for four-cycle outboard motors.

One of these problems deals with the actual positioning of the lubricant tank for the engine. In order to maintain a relatively low center of gravity and to permit a greater percentage of the powerhead to be devoted to the acceptance of the more components of the four-cycle engine, it has been proposed to position the oil tank in the upper end of the drive shaft housing. Since the engine operates with the crankshaft rotating about a vertically extending axis, dry sump-type lubricating systems are, thus, preferred for outboard motor applications of four-cycle engines. However, this unusual orientation of the engine and its relationship to the oil tank give rise to a number of difficulties in connection with the design and functioning of the lubrication system.

It is well known that the lubricating system for engines utilizing recirculating systems generally also requires the use of a crankcase ventilating system. It has been found that the life of the lubricant can be significantly improved if ventilation is provided over the lubricant. This ventilation will remove the higher volatility hydrocarbons from the lubricant without resulting in loss of lubricant, if the system is properly designed.

It is, therefore, a principal object of this invention to provide an improved lubricating and crankcase ventilating system for a four-cycle outboard motor.

It is a further object of this invention to provide an improved, compact and effective lubricating and crankcase ventilating system for a four-cycle outboard motor.

In order to offset the lower specific output per displacement of a four-cycle engine relative to a two-cycle engine, it is the practice to employ high performance techniques in conjunction with the design of four-cycle engines for outboard motor applications. These include the incorporation of such concepts as single or double overhead camshafts and multiple valves per cylinder. Again, however, the vertical disposition of the crankshaft give rise to particular problems in conjunction with the lubricating system and primarily the crankcase ventilating system of overhead cam engines having such an orientation.

It is, therefore, a still further object of this invention to provide an improved crankcase ventilating system for a four-cycle outboard motor.

It is a further object of this invention to provide an improved compact and yet highly effective crankcase ventilating system for a four-cycle outboard motor having overhead camshafts and which operates with a vertically extending crankshaft.

When the crankcase chamber is disposed in a vertical orientation and a crankcase ventilation system is incorporated, the problems of separating oil from the ventilating air are particularly acute. That is, the oil which lubricates the main and connecting rod journals of the crankshaft tend to be thrown radially outwardly from the crankshaft. If the engine is disposed so that the crankshaft rotates in a vertical orientation, this means that oil will be sprayed and present in the crankcase chamber at all places along its vertical height. Hence, the normal vertical ventilating flow is more likely to sweep lubricant particles from the crankcase chamber into the ventilating system.

This has several disadvantages. The first of these is that the amount of lubricant can be rapidly depleted. This, coupled with the small area for the lubricant storage system for the engine, presents obvious problems. Furthermore, since the purpose is to avoid the emission of lubricant into the atmosphere or water, the difficulty of separating the oil from the crankcase ventilating gases is of primary importance.

It is, therefore, a still further object of this invention to provide an improved crankcase arrangement for a four-cycle, vertically oriented engine.

It is a further object of this invention to provide an improved oil separator and catcher arrangement for such an engine.

In addition to these more sophisticated problems in connection with the design and positioning of the components for a four-cycle outboard motor, there is the more mundane, but equally important, issues of permitting the operator to easily check the amount of lubricant in the oil tank, to replenish the lubricant and to drain it. These problems also become more acute when the oil tank for the engine is positioned in substantial part in the drive shaft housing.

It is, therefore, a still further object of this invention to provide an improved oil tank location and construction for a four-cycle outboard motor.

It is a further object of this invention to provide an improved dipstick and fill arrangement for the oil tanks for such engines.

SUMMARY OF THE INVENTION

A first feature of this invention is adapted to be embodied in an outboard motor that is comprised of a powerhead consisting of a four-cycle internal combustion engine and a surrounding protective cowling. The engine includes a crankshaft journaled for rotation in a crankcase chamber formed at one end of a cylinder block having at least one horizontally disposed cylinder bore. The crankshaft rotates about a vertically extending axis. A drive shaft housing and lower unit depends from the powerhead and journals a drive shaft for rotation about a vertical axis. A propulsion device is driven the drive shaft for propelling an associated watercraft. Means are provided for coupling the crankshaft for rotation with the drive shaft for driving the drive shaft from the crankshaft. An oil reservoir for containing lubricant for the engine is disposed beneath the engine and at least, in part, in the drive shaft housing and lower unit. A cylinder head is affixed to the cylinder block and closes the end of the cylinder bore opposite the crankcase chamber. A camshaft is journaled for rotation by the cylinder head within a cam chamber formed thereby about a vertically extending axis. A timing drive is provided at the upper end of the engine for driving the camshaft in timed relationship from the crankshaft. A timing cover is affixed to the top end of the cylinder block and the cylinder head, and encloses the timing drive. The crankcase chamber and the camshaft chamber communicate with the interior of the timing cover. A ventilating gas outlet is provided in the timing cover for discharging crankcase ventilating gases from the timing cover.

Another feature of the invention is also adapted to be embodied in an outboard motor that is comprised of a powerhead consisting of a four-cycle internal combustion engine and a surrounding protective cowling. The engine includes a crankshaft journaled for rotation in a crankcase chamber formed at one end of the cylinder block having at least horizontally disposed cylinder bore. The crankshaft rotates about a vertically extending axis. A drive shaft housing and lower unit depends from the powerhead and journals a drive shaft for rotation about a vertical axis. A propulsion device is driven by the drive shaft for propelling an associated watercraft. Means are provided for coupling the crankshaft for rotation with the drive shaft for driving the drive shaft from the crankshaft. An oil reservoir for containing lubricant for the engine is disposed beneath the engine and at least, in part, in the drive shaft housing lower unit. In accordance with this feature of the invention, the oil reservoir is provided with a portion that extends in an area not covered by the engine and an oil fill opening and dipstick receiving opening is formed in the extending portion of the oil reservoir for filling the oil reservoir and checking the lubricant level therein.

A further feature of the invention is adapted to be embodied in an outboard motor that is comprised of a powerhead consisting of a four-cycle internal combustion engine and a surrounding protective cowling. The engine includes a crankshaft journaled for rotation in a crankcase chamber formed at one end of the cylinder block having at least horizontally disposed cylinder bore. The crankshaft rotates about a vertically extending axis. A drive shaft housing and lower unit depends from the powerhead and journals a drive shaft for rotation about a vertical axis. A propulsion device is driven the drive shaft for propelling an associated watercraft. Means are provided for coupling the crankshaft for rotation with the drive shaft for driving the drive shaft from the crankshaft. An oil reservoir for containing lubricant for the engine is disposed beneath the engine and at least, in part, in the drive shaft housing lower unit. The crankcase chamber is closed by a crankcase member that is fixed to the one end of the cylinder block in closing relationship thereto. A baffle plate is fixed within the crankcase chamber in spaced relationship from the crankcase member so as to permit a surface upon which oil from the crankshaft may be collected and accumulated while permitting a ventilating airflow path on both sides of the baffle plate in a vertical upward direction.

Yet another feature of the invention is adapted in an outboard motor that is comprised of a powerhead consisting of a four-cycle internal combustion engine and a surrounding protective cowling. The engine includes a crankshaft journaled for rotation in a crankcase chamber formed at one end of the cylinder block having at least horizontally disposed cylinder bore. The crankshaft rotates about a vertically extending axis. A drive shaft housing and lower unit depends from the powerhead and journals a drive shaft for rotation about a vertical axis. A propulsion device is driven the drive shaft for propelling an associated watercraft. Means are provided for coupling the crankshaft for rotation with the drive shaft for driving the drive shaft from the crankshaft. An oil reservoir for containing lubricant for the engine is disposed beneath the engine and at least, in part, in the drive shaft housing lower unit. The cylinder block is provided with a return path that extends vertically downwardly therethrough in aligned relationship with the oil reservoir for returning oil to the oil reservoir from the engine. A fill and dipstick receiving opening is formed in the engine in alignment with the return path for filling the oil reservoir and checking the level therein.

BRIEF DESCRIPTION OF THE DRAWINGS

FIG. 12 is an enlarged cross-sectional view taken along a plane parallel to the plane along which FIG. 7 is taken, but passing through the axis of rotation of the crankshaft, and shows more details of the lubricating system for the engine and some of the accessory drive arrangements therefor.

DETAILED DESCRIPTION OF THE PREFERRED EMBODIMENTS OF THE INVENTION

Figure 1:
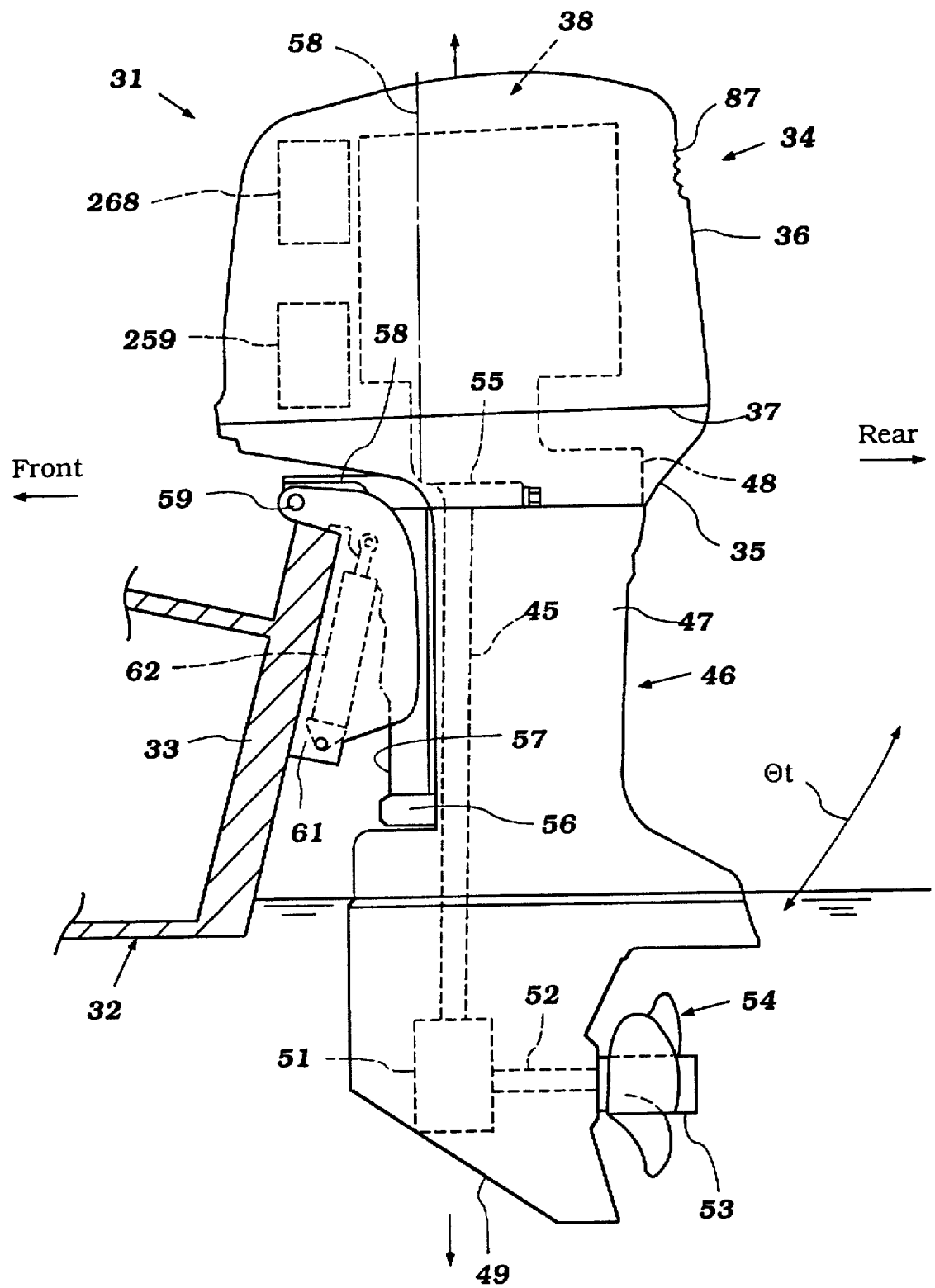
FIG. 1 is a side elevational view of an outboard motor constructed in accordance with an embodiment of the invention, shown as attached to a transom of an associated watercraft, which watercraft is shown partially and in section.
Figure 2:
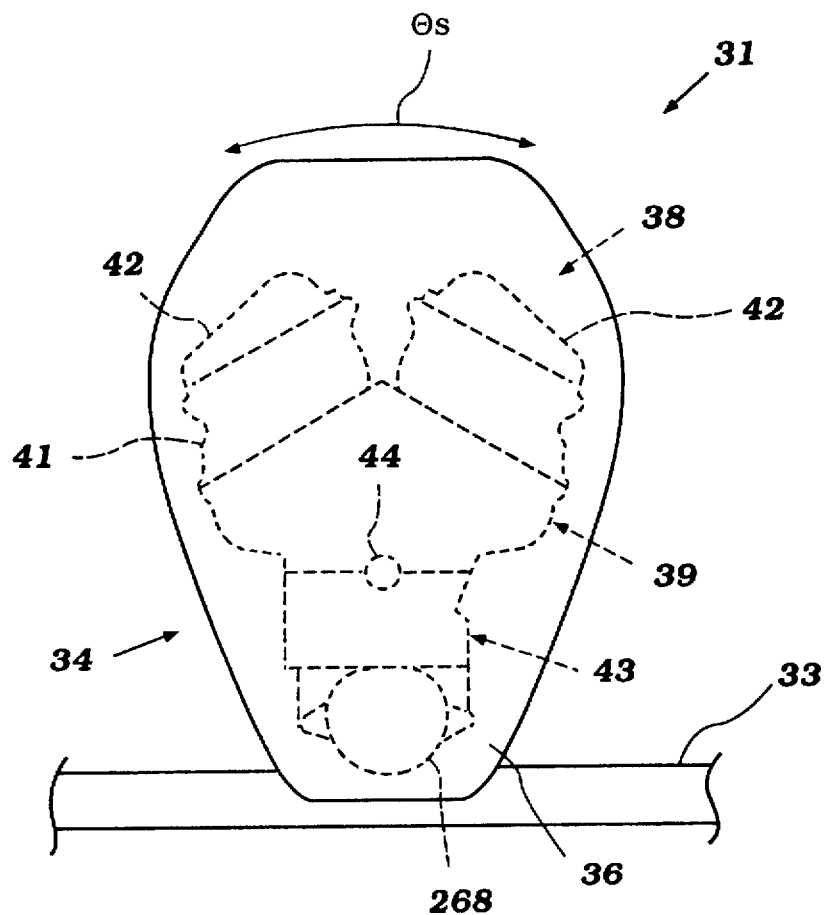
FIG. 2 is a top plan view of the outboard motor and a portion of an accompanying watercraft transom.

Referring first in detail to FIGS. 1 and 2, an outboard motor constructed in accordance with an embodiment of the invention is identified generally by the reference numeral 31. For orientation purposes, the outboard motor 31 is shown as being attached to an associated watercraft hull, indicated generally by the reference numeral 32 and shown partially and in cross-section. More specifically, the outboard motor 31 is attached to a transom 33 of the hull 32 in a manner which will be described.

The outboard motor 31 is comprised of a power head, indicated generally by the reference numeral 34. The power head 34 is comprised of a lower tray portion 35 which may be formed from aluminum or an aluminum alloy, and a main cowling portion 36 that is detachably connected to the tray 35 in a known manner. The main cowling portion 36 is formed from a suitable material such as a molded fiberglass reinforced resin or the like. The main cowling portion 36 has a lower peripheral edge 37 that is held in sealing engagement with the tray portion 35 by a suitable latching arrangement (not shown).

The protective cowling encircles an internal combustion engine, indicated generally by the reference numeral 38, and which has a construction as will be described in more detail by reference to later figures. In this embodiment, however, the engine 38 is of the V-6 type, and thus includes a cylinder block 39 which has a pair of cylinder banks that are closed by cylinder head assemblies 41 in a manner which will be described. Cam covers 42 are affixed to the cylinder head assemblies 41 and enclose respective cam chambers in which the valve actuating mechanism, which will be described, is contained. This valve actuating mechanism is comprised of a pair of twin overhead camshafts for each cylinder head assembly.

A crankcase member 43 is affixed to the end of the cylinder block 39 opposite the cylinder heads 41. A crankshaft 44 is rotatably journaled in a crankcase chamber formed by the cylinder block 39 and the crankcase member 43. The manner of this journaling will be described later.

However, it should be noted and as is typical with outboard motor practice, the engine 38 is mounted in the power head 34 so that the crankshaft 44 rotates about a vertically extending axis. This facilitates coupling to a drive shaft 45 in a manner which will be described. The drive shaft 45 depends into and is journaled within a drive shaft housing, indicated generally by the reference numeral 46, and which is enclosed in its upper end by the tray 35. This drive shaft housing 46 includes an outer housing casing 47. An exhaust guide plate assembly 48 is interposed, in a manner to be described, between the engine 38 and the upper end of the drive shaft housing 46.

The drive shaft 45 depends into a lower unit 49, wherein it drives a conventional bevel gear, forward neutral reverse transmission, indicated generally by the reference numeral 51 and shown only schematically. The transmission 51 is shown in a schematic fashion because its construction per se forms no part of the invention. Therefore, any known type of transmission may be employed.

The transmission 51 drives a propeller shaft 52 which is journaled within the lower unit 49 in a known manner. A hub 53 of a propeller, indicated generally by the reference numeral 54, is coupled to the propeller shaft 52 for providing a propulsive force to the watercraft hull 32 in a manner well known in this art.

A steering shaft (not shown) is attached to the drive shaft housing outer housing 47 by means including an upper bracket assembly 55 in a manner which will be described in more detail later by reference to FIGS. 12 and 16, and a lower bracket assembly 56, in a manner generally known in this art.

The steering shaft is supported for steering movement within a swivel bracket 57 for steering movement about a steering axis 58. The steering axis 58 is juxtaposed to and slightly forward of the drive shaft axis 45. A tiller or steering arm 58 is affixed to the upper end of the steering shaft for steering of the outboard motor 31 through an arc, as indicated at $q_s$ in FIG. 2.

The swivel bracket 57 is connected by means of a pivot pin 59 to a clamping bracket, indicated generally by the reference numeral 61. The pivot pin 59 permits tilt-and-trim movement of the swivel bracket 57 and outboard motor 31 relative to the transom 33 of the hull 32. This tilt-and-trim movement is indicated by the arc $q_t$ in FIG. 1.

A hydraulic tilt-and-trim mechanism 62 may be pivotally connected between the swivel bracket 57 and clamping bracket 61 for not only effecting hydraulic tilt-and-trim movement, but also for permitting the outboard motor 31 to pop up when an underwater obstacle is struck. As is well known, these types of hydraulic mechanisms 62 then permit the outboard motor 31 to return to its previous trim-adjusted position once the underwater obstacle is cleared.

As thus far described, the general configuration of the outboard motor 31 may be considered to be conventional, except for the use of the twin overhead cam V-type engine 38.

Figure 3:
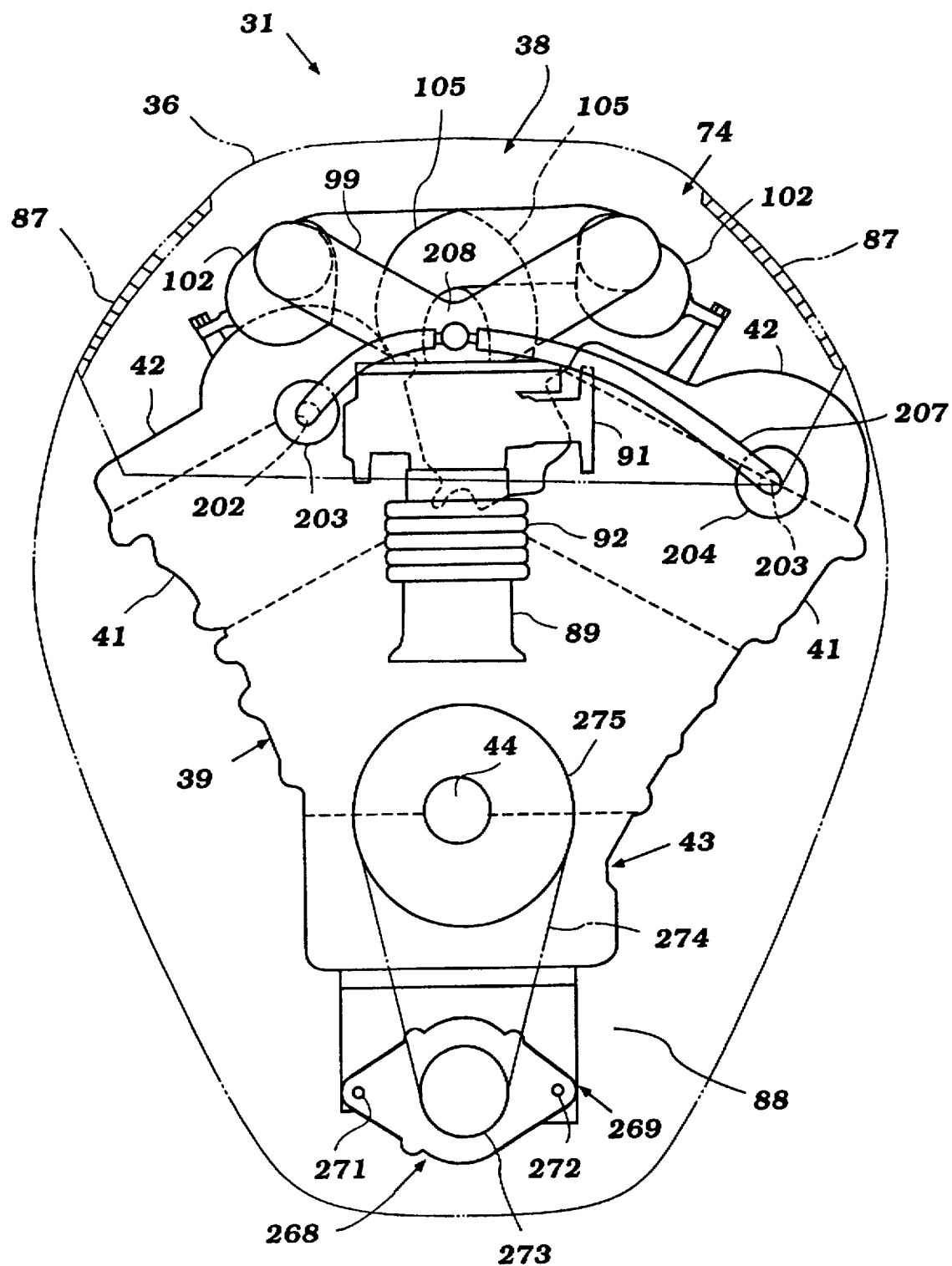
FIG. 3 is an enlarged top plan view, looking in the same direction as FIG. 1, but with the major portion of the protective cowling shown in phantom with the remaining portions shown in cross section.

The construction of the engine 38 will now be described in more detail, referring first primarily to FIGS. 3–5, with the primary emphasis being on this latter figure. As has been noted, the engine 38 is of the V-type and, accordingly, the cylinder block 39 is formed with a pair of angularly related cylinder banks, each of which is formed with a plurality of horizontally extending cylinder bores 63. These cylinder bores 63 may be formed from thin liners that are either cast or otherwise secured in place in the cylinder block 39. Alternatively, the cylinder bores 63 may be formed directly in the base material of the cylinder block 39. Where light alloy castings are employed for the cylinder block 39, however, such liners are preferred.

In the illustrated embodiment, the engine 38 is, as noted, of the V-6 type, and hence, each cylinder bank, indicated by the reference numeral 64, is formed with three cylinder bores 63. The cylinder bores 63 of the cylinder bank 64 are preferably staggered relative to each other.

Pistons 65 are supported for reciprocation in the cylinder bores 63. Piston pins 66 connect the pistons 65 to respective connecting rods 67. The connecting rods 67, as is typical in V-type practice, may be journaled in side-by-side relationship on a common throw 68 of the crankshaft 44. That is, pairs of cylinders, one from each cylinder bank 64, may have the big ends of their connecting rods 67 journaled in side-by-side relationship on a common crankshaft throw 68. This is one reason why the cylinder bores 63 of the cylinder bank 64 are staggered relative to each other. In the illustrated embodiment, however, separate throws are provided for the cylinders of each bank. The throw pairs are nevertheless disposed between main bearings of the crankshaft to maintain a compact construction.

The crankshaft 44 is journaled, as previously noted, for rotation about a vertically extending axis within a crankcase chamber 69, formed by the crankcase member 43 and a skirt 71 of the cylinder block 39. This manner of journaling will be described later by reference to other figures in connection with the description of the lubricating system, including FIGS. 12, 13 and 14.

The cylinder heads 41 are provided with individual recesses 72 which cooperate with each of the cylinder bores 63 and the heads of the pistons 65 to form the combustion chambers. These recesses 72 are surrounded by a lower cylinder head surface that is held in sealing engagement with either the cylinder block cylinder blocks 64 or with cylinder head gaskets interposed therebetween, in a known manner. These planar surfaces of the cylinder head may partially overlie the cylinder bores 63 to provide a squish area, if desired. The cylinder heads 41 are affixed in any suitable manner to the cylinder block banks 64.

Because of the angular inclination between the cylinder banks 64 and as is typical with V-type engine practice, a valley 73 is formed between the cylinder heads 41 and in part between the cylinder banks 64. An induction system for the engine, indicated generally by the reference numeral 74, is positioned in part in this valley.

This induction system includes intake passages 75 which extend from a surface 76 of the cylinder heads 41 to valve seats formed in the combustion chamber recesses 72. The arrangement may be such that either a single intake passage and port is formed for each combustion chamber recess 72 or, alternatively, there may be multiple valve seats.

Poppet-type intake valves 77 are slidably supported in the cylinder heads 41 in a known manner, and have their head portions engageable with these valve seats so as to control the flow of the intake charge into the combustion chambers through the intake passages 75. The way in which the charge is delivered to these intake passages 75 by the induction system 74 will be described in more detail subsequently. That is, the remainder of the induction system 74 will be described later, by primary reference to FIGS. 7 and 8.

The intake valves 77 are urged toward their closed positions by coil compression springs (not shown). These valves are opened by intake camshafts 78 which are journaled in the cylinder head assemblies 41 in a manner which will be described in more detail later, by primary reference to FIG. 11. The intake camshafts 78 are driven from the crankshaft 44 by a drive, which will also be described in more detail later, primarily by reference to FIG. 6. The intake camshafts 78 have cam lobes, to be described, which operate the valves 77 through thimble tappets 79.

On the outer side from the valley 73, each cylinder head 41 is formed with one or more exhaust passages 81. The exhaust passages 81 emanate from one or more valve seats formed in the cylinder head recesses 72, and cooperate with exhaust systems that include exhaust manifolds, indicated generally by the reference numeral 82, for discharge to the atmosphere through a path that will be described later, and in more detail by reference primarily to FIGS. 16–21.

Exhaust valves 83 are supported for reciprocation in the cylinder heads 41 in a manner similar to the intake valves 77. These exhaust valves 83 are urged toward their closed positions by coil compression springs (not shown). The exhaust valves 83 are opened by overhead mounted exhaust camshafts 84, which are journaled for rotation in the cylinder heads 41, in a manner which will also be described later. The rotational axes of the intake camshafts 78 and exhaust camshafts 84 are parallel to each other. The exhaust camshafts 84 have cam lobes, to be described later, that cooperate with thimble tappets 85 for operating the exhaust valves 83 in a known manner. Like the intake camshafts 78 the exhaust camshafts 84 are driven from the crankshaft 44 in a manner which will be described.

The valve actuating mechanism as thus far described is contained within cam chambers 86 formed by each cylinder head 41 and closed by the aforenoted cam covers 42.

The induction system 74 for the engine 38 will now be described by primary reference to FIGS. 3–5, 7 and 8. As is typical with outboard motor practice, the protective cowling, and specifically the main cowling portion 36, is formed with air inlet openings 87. The openings 87 are preferably configured so as to permit copious amounts of air to flow into the interior of the protective cowling while at the same time precluding or substantially precluding water entry. Any of the known inlet type devices can be utilized for this purpose, and therefore, the cowling air inlet openings 87 are shown only schematically.

In conjunction with the induction system for the engine, it is desirable to provide a relatively large plenum area that supplies the individual cylinders through respective runners. The use of a plenum area is desirable so as to minimize the interference from one cylinder to the others. This presents a particular space problem, particularly in conjunction with outboard motors where space is obviously at a premium. Therefore, the induction system 74 is designed so as to provide a large plenum volume and still maintain a compact construction. Furthermore, the construction is such that servicing of the engine is not significantly affected.

Figure 7:
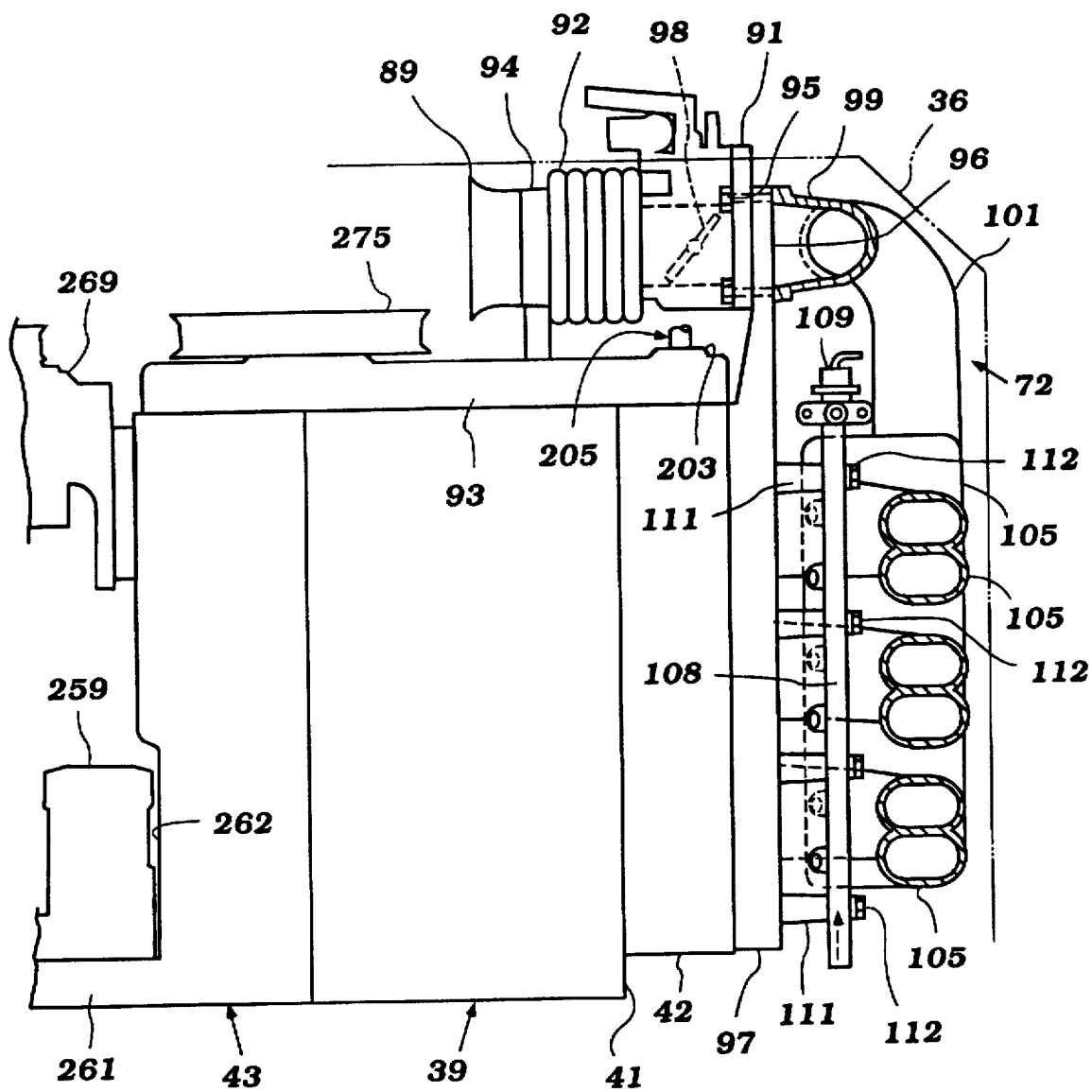
FIG. 7 is a side elevational view of a portion of the power head showing the engine in solid lines with the protective cowling being shown primarily in phantom and with portions of the engine broken away and other portions shown in section.
Figure 8:
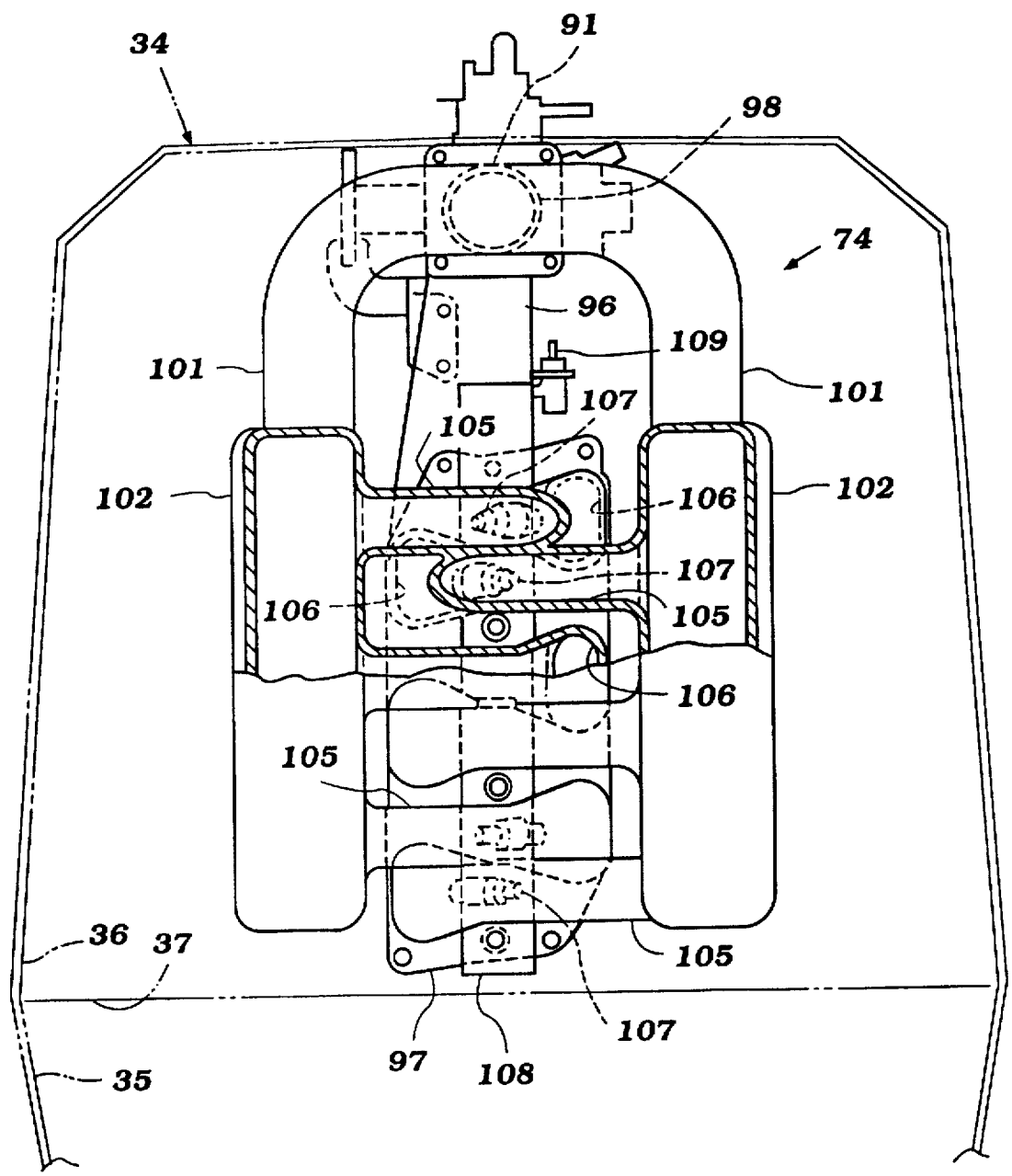
FIG. 8 is a rear elevational view of the components shown in FIG. 7 but with additional components broken away and shown in section.

The air which enters the protective cowling, and specifically the chamber 88 around the engine 38, flows into an air inlet device 89. It should be noted that the air inlet device 89 faces forwardly away from the cowling inlet openings 87. This, in effect, provides a circuitous path of air flow which assists in separation of water from the inducted air. The air inlet device 89 serves a throttle body 91 through a flexible conduit 92. The flexible conduit 92 is utilized because the air inlet device 89 is mounted on a front timing cover 93 of the engine 38 by a mounting bracket 94, as best seen in FIG. 7. The throttle body 91 has a flange portion that is connected by fasteners 95 to an extension 96 of a flange 97 of an intake manifold assembly, which will be described.

A throttle valve 98 is journaled in the throttle body 91 and is operated by a remote actuator. By utilizing a single throttle body 91 and single throttle valve 98 for the entire induction system, the overall construction can be significantly simplified.

The throttle body 91 is also affixed to a Y pipe 99 which is positioned on or forms a part of the flange 97 of the aforenoted intake manifold. This Y pipe 99 has a pair of branch sections 101, each of which extends to a respective plenum chamber 102. The plenum chambers 102 overlie the respective cam covers 42 and are mounted thereon by mounting posts 103 and threaded fasteners 104 so as to provide a rigid assembly. As may be seen best from FIG. 8, these plenum chambers 102 extend substantially the full length of the respective cylinder banks 41, and thus provide a fairly substantial volume for the inducted air.

Each plenum chamber 102 has a plurality of runners, one for each cylinder of the opposite cylinder bank, these runners being indicated by the reference numeral 105. The runners 105 extend transversely across the upper portion of the engine valley area 73 and then turn downwardly so as to communicate with respective passages 106 formed in the manifold flange 97. These passages 106 are in direct alignment with the cylinder head intake passages 75 of the respective cylinder head.

Thus, this arrangement provides not only a large effective plenum chamber volume, since each plenum chamber 102 serves only three cylinders, but also provides relatively long runners 105 that extended from the plenum chamber volumes 102 to the cylinder head intake passages 75. Thus, the length of these runners 105 can be tuned relative to the volume so as to provide the desired charging effect in the induction system. The described arrangement with the long runners 105 is particularly effective at mid-range speeds.

In the illustrated embodiment, the engine 38 is provided with a manifold-type fuel injection system. This fuel injection system also appears in most detail in FIGS. 4, 5, 7 and 8, and includes a plurality of fuel injectors 107, one for each cylinder head intake passage 75. These fuel injectors 107 are disposed in the area between the re-entrant portions of the manifold runners 105 and hence, are protected by these runners, since they are partially surrounded by them, while at the time being accessible. In addition, air flow over the injectors 107 is possible so as to cool the injectors along with the air flowing through the runners 105. Preferably, the injectors 107 are of the electrically operated type embodying solenoid actuated valves, and hence, there is some heat generated associated with their operation.

Figure 5:
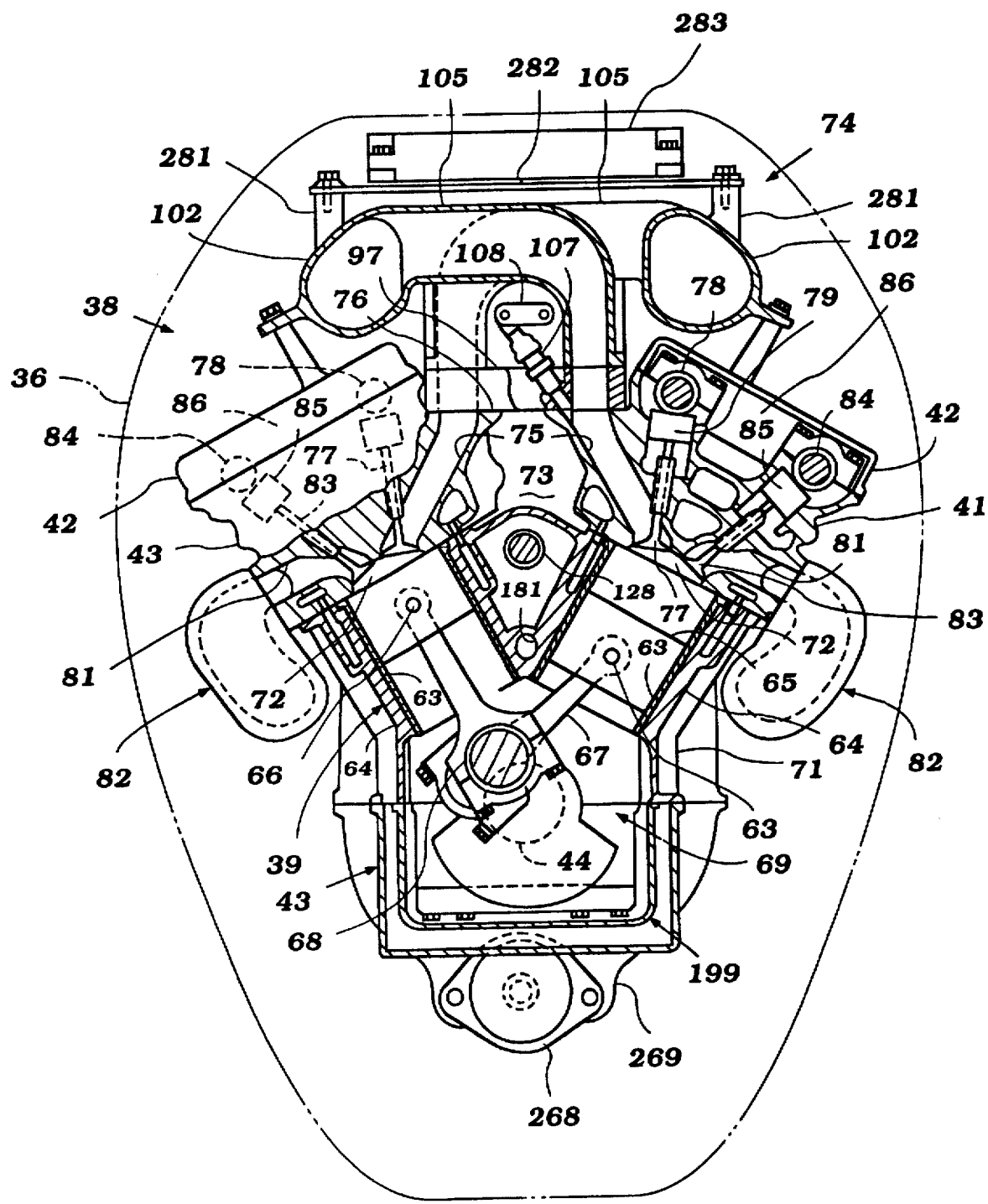
FIG. 5 is a view looking in the same direction as FIGS. 2–4 but with further portions broken away and shown in cross-sectional and again showing the protective cowling in phantom.

The injectors 107 for the respective cylinder banks are mounted in the manifold flange 97 contiguous to its flow passages 106, and in general alignment with the cylinder head intake passages 75, as best seen in FIG. 5. Hence, the spray from the injectors 107 can easily mix with the air flowing into the combustion chamber so as to provide a good mixture distribution.

The injectors 107 have their inlet tip portions received in a fuel rail 108 that extends vertically through the area encompassed by the runners 105 and also protected by them. The fuel rail 108 has two flow passages, one for the injectors 107 of each bank so that the flow passages are in side-by-side relationship and accommodate the crossed-over relationship of the injectors 107 when viewed in top plan.

A suitable fuel supply system is provided for supplying fuel to the fuel rail 108. This supply system includes a pressure regulator 109 that communicates with the fuel rail 108 and which permits the maintenance of the desired fuel pressure by dumping excess fuel back to the fuel tank through an appropriate return conduit. Fuel is supplied to the fuel rail 108 by a suitable supply system in the direction shown by the arrow in FIG. 7, which supply system is not shown further in the figures. Reference may be had to any known type of construction for a suitable fuel supply system.

The fuel rail 108 is mounted on the manifold flange 97 by means of a plurality of bosses 111 and threaded fasteners 112 so as to provide a rigid assembly and ensure against dislocation of the fuel rail 108 from the injectors 107.

Although not shown in the drawings, spark plugs are mounted in the cylinder heads 41 with their gaps extending into the recesses. These spark plugs are fired by a suitable ignition system in a known manner.

Figure 11:
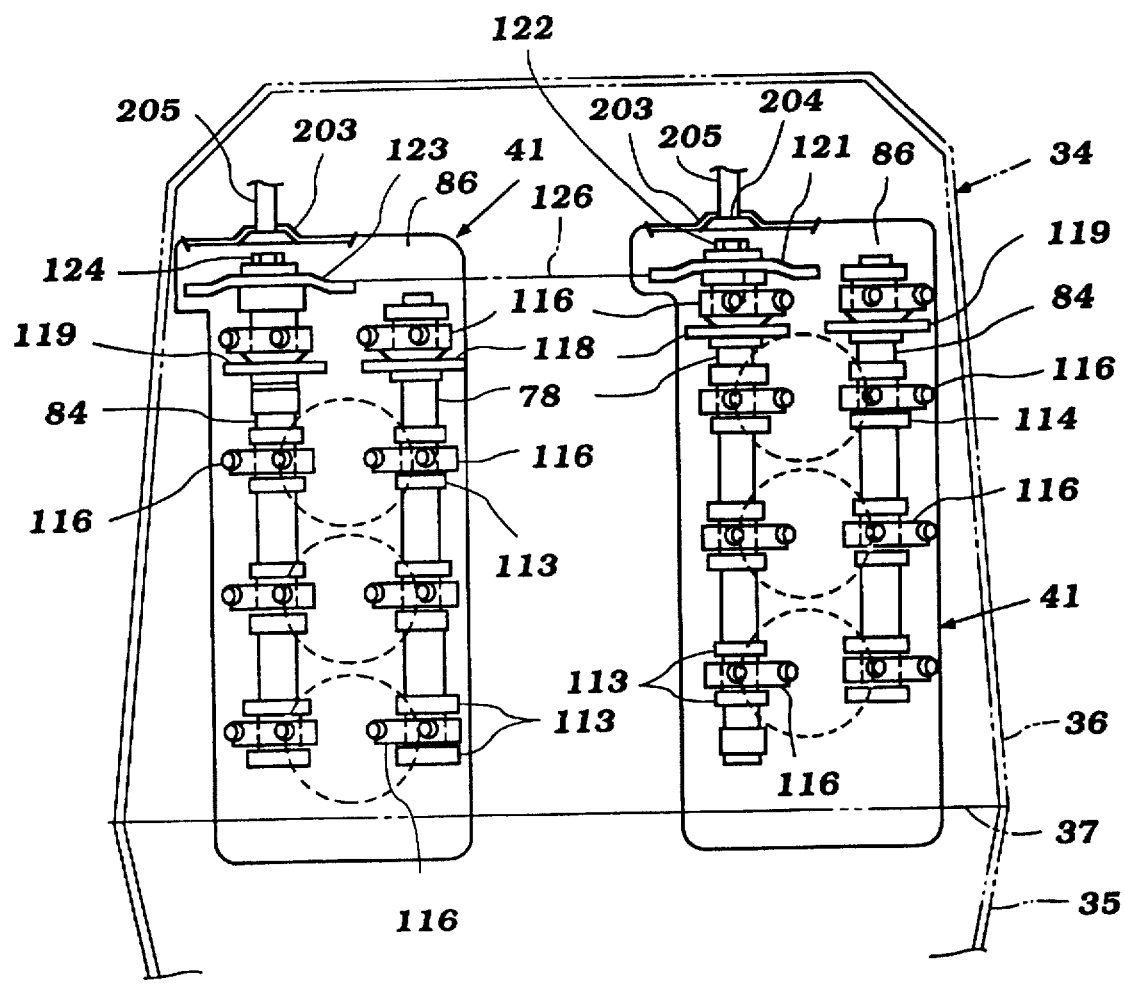
FIG. 11 is a rear elevational view, looking in the same direction as FIG. 8, but with the induction system and cam covers removed so as to more clearly show the camshaft driving arrangement and other portions of the crankcase ventilating system for the engine.

The drive for the intake and exhaust camshafts 78 and 84 for each of the cylinder banks will now be described by primary reference to FIGS. 5, 6, 11 and 12. Referring first to FIGS. 5 and 11, it should be noted that each of the camshafts is provided with respective cam lobes 113 and 114 for operating the thimble tappets 79 and 85 associated with the intake and exhaust valves 77 and 83, respectively. Between these pairs of cam lobes, there are provided bearings surfaces on the camshafts 78 and 84. These bearing surfaces of the camshafts are journaled within cylinder head bearing surfaces which appear in FIG. 14 and which bearing surfaces are indicated by the reference numerals 115. Bearing caps 116 are affixed to the cylinder heads 41 so as to complete the journaling of the intake and exhaust camshafts 78 and 84.

The intake and exhaust camshafts 78 and 84 of each cylinder head 41 are connected for simultaneous rotation by means of a timing chain 117 that is enmeshed with sprockets 118 and 119 formed on the intake and exhaust camshafts 78 and 84, near but not at one end thereof, respectively. This interconnection between the camshafts 78 and 84 of each cylinder head 41 permits only one of these camshafts to be driven by the crankshaft by a timing mechanism, which will be described shortly. This facilitates and simplifies the timing chain arrangement for the overall engine.

Figure 6:
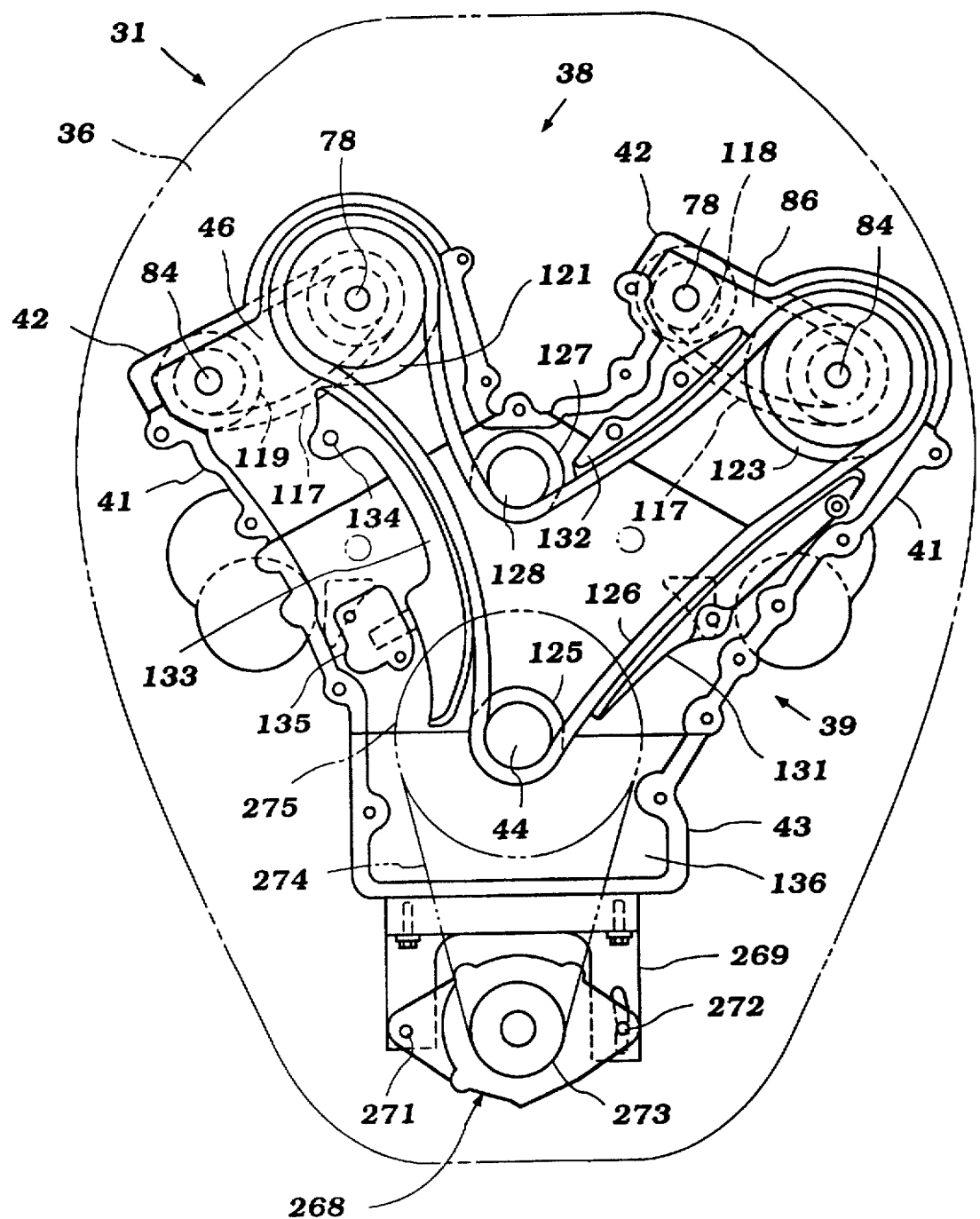
FIG. 6 is a top plan view, looking in the same direction as FIGS. 2–5 but with the front or timing chain cover of the engine and other components such as the induction system removed.

To accomplish this drive, a driving sprocket 121, is affixed to the upper end of the intake camshaft 78 of the left-hand cylinder bank when viewed in top plan view, as seen in FIG. 6. This sprocket is held in place by a threaded fastener 122. In a similar manner, a timing sprocket 123 is affixed to the upper end of the exhaust camshaft 84 of the remainder cylinder head 41 by means of a threaded fastener 124.

Figure 12:
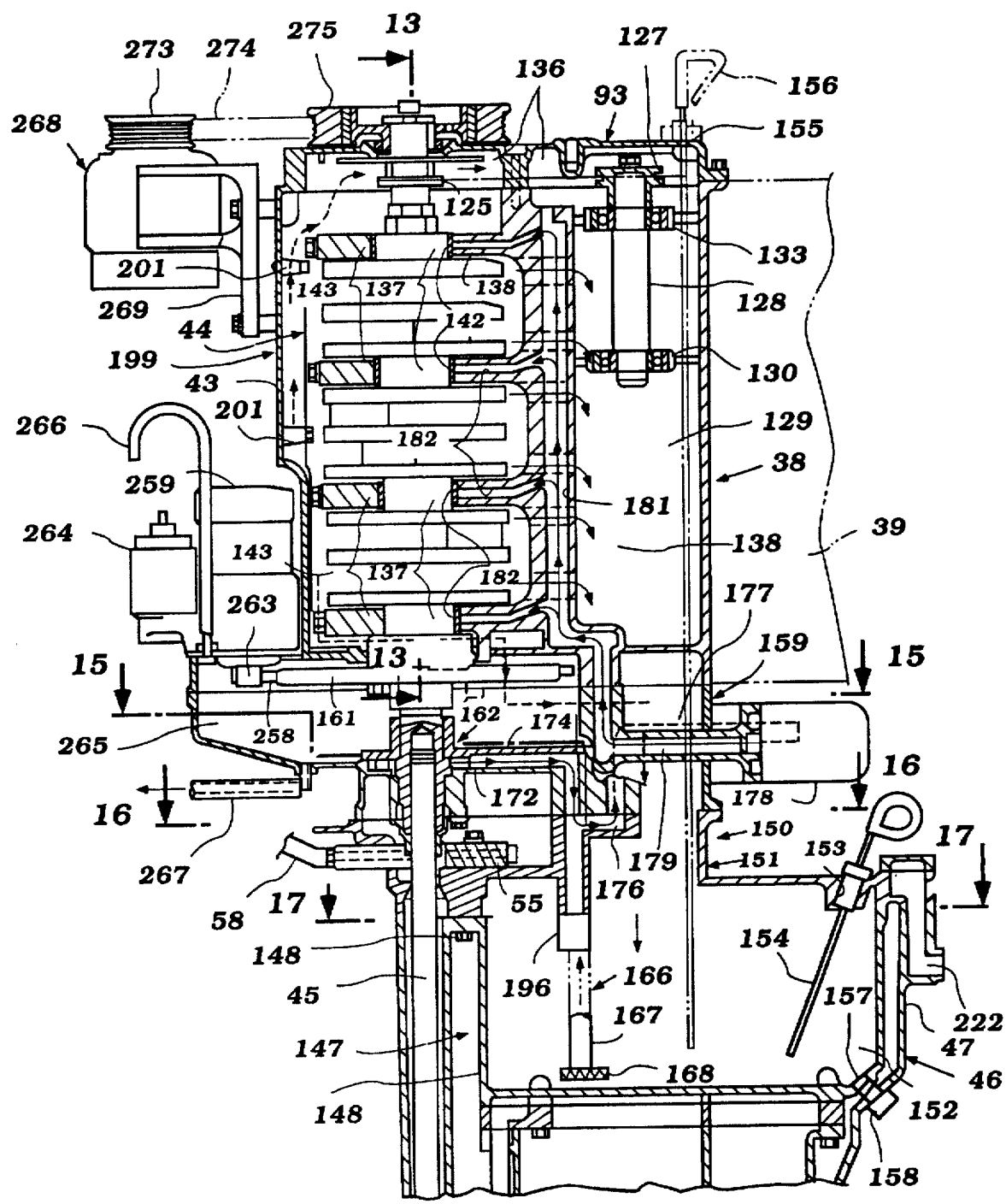

As may be best seen in FIGS. 6 and 12, a timing sprocket 125 is affixed for rotation with the upper end of the crankshaft 44 in an appropriate manner. This sprocket 125 has a diameter equal to one half of the diameter of the cam shaft sprockets 121 and 123 to provide the one half to one speed ratio for the camshafts 78 and 84 as is required. A timing chain 126 is trained over the crankshaft sprocket 125 and engages first the sprocket 123 of the exhaust camshaft 84 of the right-hand cylinder bank. Hence, this camshaft is driven directly from the crankshaft 44 at a one-half speed ratio, as is known in this art. As has been previously noted, the intake camshaft 78 of this cylinder bank is driven from the exhaust camshaft 84 by the timing chain 117.

From the sprocket 123, the timing chain 126 passes downwardly into the valley between the cylinder banks where it engages an idler sprocket 127 that is journaled on an idler shaft 128 and which has a smaller diameter than the sprockets 121 and 123 to maintain a compact construction. The idler shaft 128 is journaled in a chamber 129 formed in the cylinder block immediately below the valley 73. The cylinder block is provided with a pair of walls in which bearings 130 are positioned for journaling the idler shaft 128.

The chain 126 then turns upwardly so as to drive the timing sprocket 121 of the intake camshaft 78 associated with the remaining cylinder head 41. As has been previously noted, the exhaust camshaft 84 of this cylinder bank is driven by the timing chain 117.

From the sprocket 121, the timing chain 126 returns to the crankshaft-driven sprocket 125. A first timing chain guide rail 131 is mounted in the timing chain case formed by the timing cover 93 at the front of the cylinder block and engages the driving flight of the chain 126 to maintain it in contact with the crankshaft sprocket 125 and the exhaust camshaft sprocket 123. A similar guide rail 132 is mounted in the right-hand bank cylinder head 41 to engage the flight of the chain 126 passing between the sprocket 123 and the idler sprocket 127.

Finally, a tensioner guide 133 is pivotally supported on the remaining cylinder head 41 about a pivot pin 134. A hydraulically urged tensioner element 135 engages the tensioner guide 133 and maintains the desired tension on the trailing or return side of the drive chain 126.

It should be noted that the cylinder heads 41, cylinder block 39 and crankcase member 43 all have sealing surfaces seen in FIG. 6 that are sealingly engaged by the timing case cover 93 so as to form a closed chamber at least one function of it which will be described later. This timing case chamber is indicated generally by the reference numeral 136.

Figure 13:
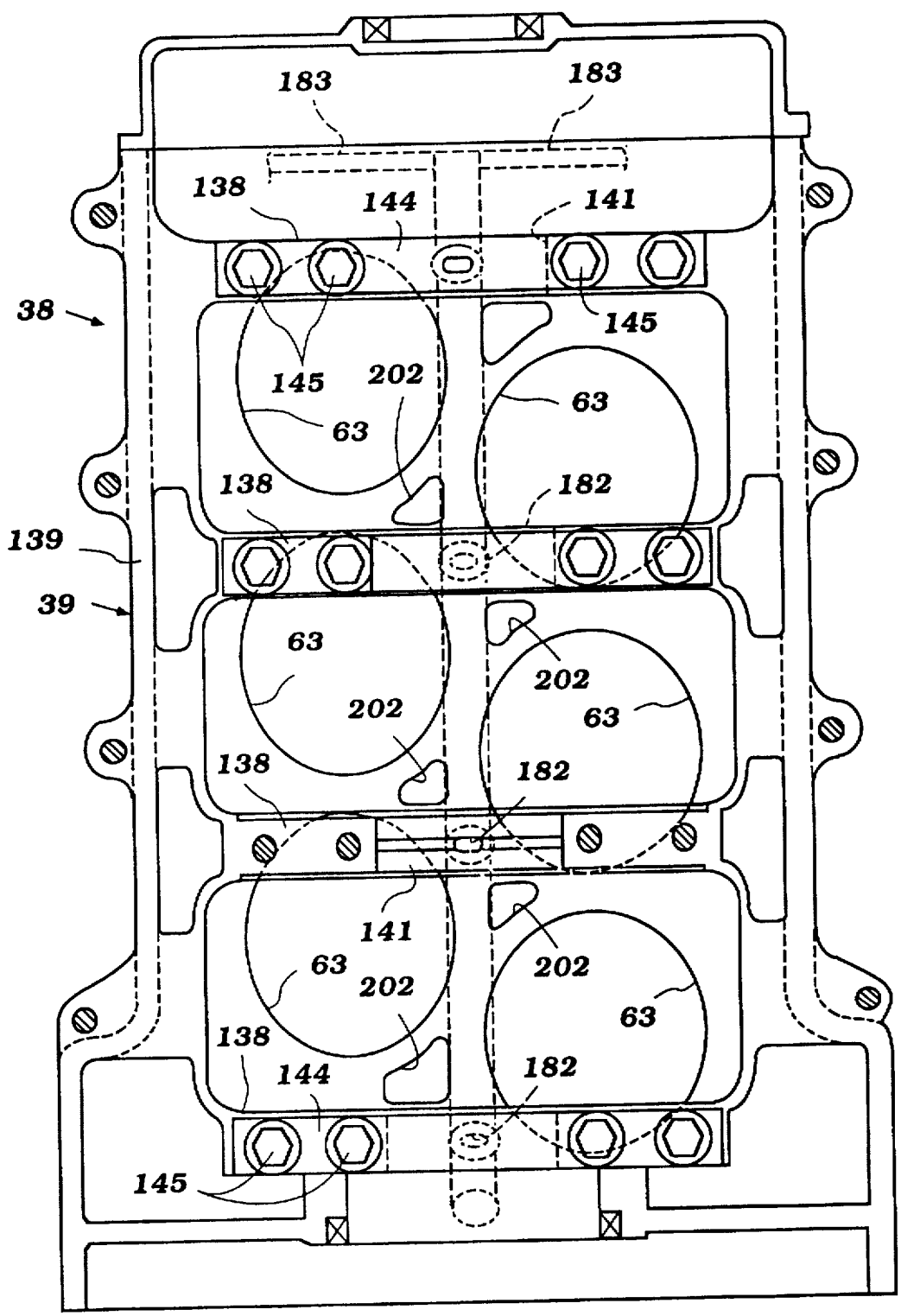
FIG. 13 is an enlarged view showing the lower portion of the cylinder block and is taken generally along the line 13—13 of FIG. 12 but with all components other than the bearing caps removed.
Figure 14:
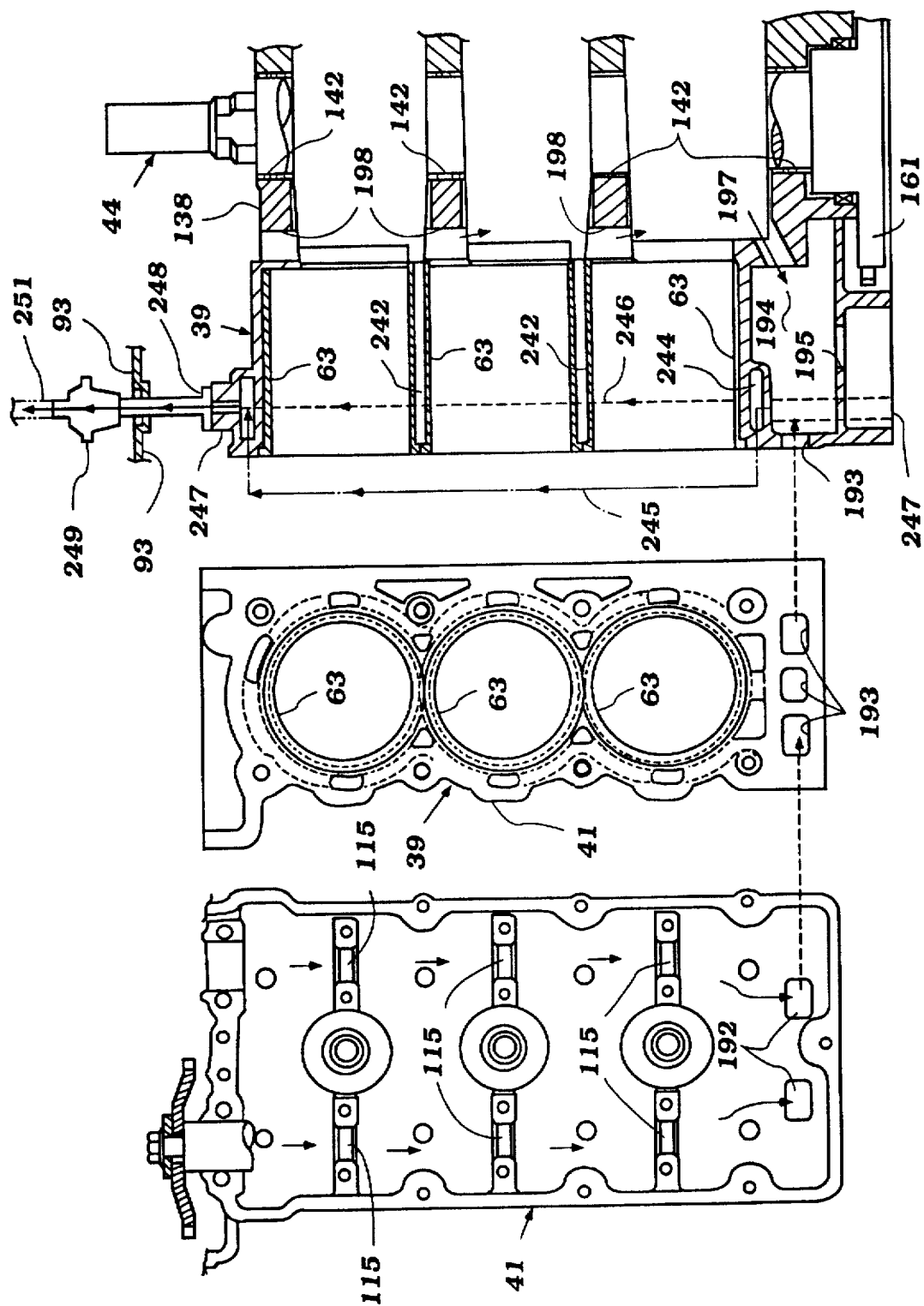
FIG. 14 is a somewhat exploded view showing, on the left-hand side, the top of one of the cylinder heads with the valves and valve operating system removed; in the center, the associated top deck of the cylinder block with the pistons removed and, on the right-hand side, a cross-sectional view through the same area of the cylinder block to show the crankcase ventilating system lubricant drain and cooling arrangement for the engine.

The lubricating system for the engine 38 including the arrangement for journaling the crankshaft 44 and the crankcase ventilating system will now be described by reference primarily to FIGS. 5 and 9–15. Referring first to FIGS. 12–14, the journaling arrangement for the crankshaft 44 will be described in detail. It should be noted that the crankshaft 44 is formed with four main bearing surfaces 137, each of which is configured so as to be aligned with a bearing surface formed in a respective web 138 of the skirt portion 139 of the cylinder block 39. These bearing surfaces are indicated at 141 and are adapted to receive segmented bearings 142. Bearing caps 143 are affixed to these cylinder block webs 138 by threaded fasteners 145 and thus complete the journaling of the crankshaft 44 in the crankcase chamber formed by the skirt 139 and the crankcase member 43.

FIG. 12 shows in more detail the coupling between the lower end of the crankshaft 44 and the upper end of the drive shaft 45. This coupling is indicated generally by the reference numeral 146 and has a connection at its upper end to or is integrally formed with the lower end of the crankshaft 44 and a splined connection to the upper end of the drive shaft 45. As will be described later, the oil pump for the engine is also provided in this area. Obviously, the vertical disposition of the crankshaft 44 and the crankcase chamber necessitates the use of a dry sump type of lubrication system for the engine. In order to maintain a relatively low center of gravity and still to maintain a large oil capacity, an oil reservoir or storage tank 147 is positioned so as to extend in substantial part into the upper end of the drive shaft housing 46. Specifically, this oil reservoir includes an outer housing 148 that has an outwardly extending flange 149 that affords a means for affixing the oil tank housing 148 to a lower plate 151 which extends across the upper end of the drive shaft housing 46 and which forms the lower portion of an exhaust guide plate assembly indicated generally by the reference number 150.

This closure plate 151 has a recessed lower area which forms an extension of the oil tank 147 and thus provides a large internal cavity 152 having a configuration which will be described in added detail later. The upper end of the closure plate 151 to the rear of the engine 38 and in the area below the valley 73 as provided with a oil fill and dipstick receiving opening 153 in which a ullage rod or dipstick 154 is positioned. Alternatively, the timing case cover 93 may be provided with a fill opening 155 in order to pass a longer ullage rod or dipstick 156 as shown in phantom in FIG. 12. Either arrangement permits ease of checking of the oil level in the reservoir chamber 152 and replenishing of it.

The oil tank forming shell 148 has a portion that extends rearwardly adjacent the drive shaft housing outer shell 47 and which is formed with a drain opening 157. A drain plug 158 is threaded into this drain opening so as to normally prevent leakage of oil from the tank 147. However, the tank 147 can be easily drained by removing the plug 158 without necessitating removing any outer cowling or without removing the outboard motor 31 from the watercraft transom 33.

The upper end of the closure plate 151 is engaged by an upper closure plate, indicated generally by the reference numeral 159 which completes the exhaust guide assembly 150. The upper closure plate of the exhaust guide 150 defines a flywheel chamber in which a flywheel 161 is contained. The flywheel 161 is affixed to the crankshaft 44 above the coupling 146 to the drive shaft 45 and above the previously-referred to oil pump, which is indicated generally by the reference numeral 162. This oil pump 162 is shown in most detail in FIG. 15. As will be seen, the oil pump 162 is of the geroter type. The oil pump 162 includes an internal gear or rotor 163 which has a connection to the crankshaft 44 so as to rotate with it. This inner rotor 163 has teeth 164 that are intermeshing with teeth of an internal cooperating pumping member 165 that is contained within the pumping cavity formed by the closure member 159 so as to operate as a high pressure, positive displacement pump, as is well known in this art.

Again referring to FIG. 12, an oil pickup, indicated generally by the reference numeral 166 depends from the closure plate 159 into a lower area of the oil tank reservoir 152. This oil pickup 166 includes a pickup tube 167 having a strainer 168 at its lower end. The upper end of the tube 166 cooperates with an inlet nipple 169 formed by the closure member 159 and which communicates with an inlet oil path 171 for delivering lubricant from the oil reservoir 147 to the oil pump 162.

Figure 15:
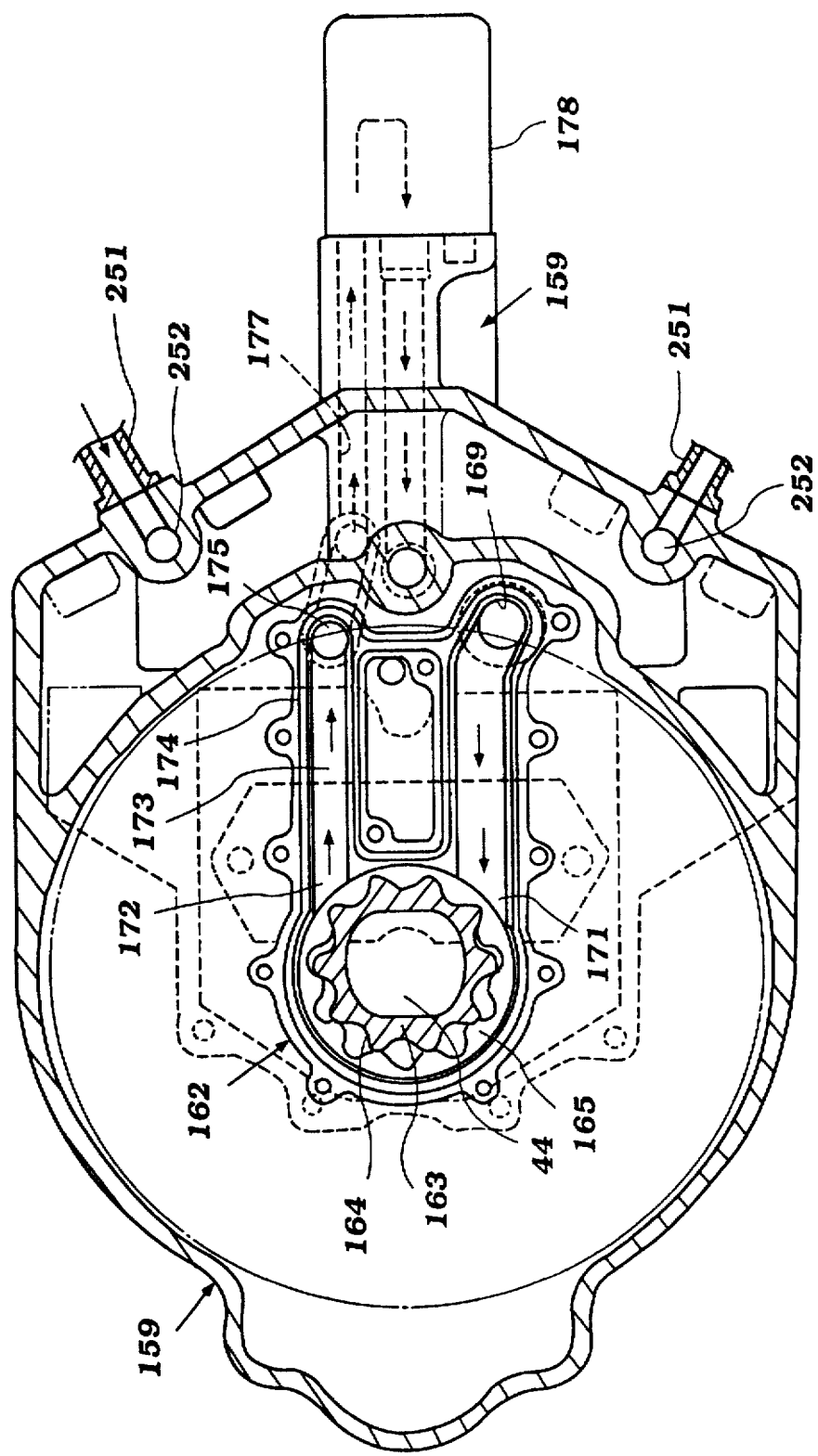
FIG. 15 is an enlarged cross-sectional view taken along the line 15—15 of FIG. 12, and shows the oil pump and the lubricant flow between the oil reservoir and the oil filter, as well as some components of the crankcase ventilating system for the engine.

Extending parallel to this inlet path 171 is a discharge path indicated generally at 172 so that oil will be pumped as shown by the arrows in FIG. 15 to a oil discharge path 173 formed in a further portion 174 of the lower closure plate 159. This path 173 communicates with a discharge nipple 175 which, in turn, flows into a passage 176 formed in the exhaust guide 150.

This passageway 176 communicates with a further passageway 177 formed in the closure member 159 which communicates with the inlet side of a replaceable oil filter of the cartridge type 178. This oil filter 178 is conveniently positioned adjacent the upper surface of the oil tank 147 and in proximity to one of the alternative ullage rod or dipstick locations 154. As a result, the oil filter may conveniently be replaced again only with the necessity of removing the upper protective cowling 36.

Figure 9:
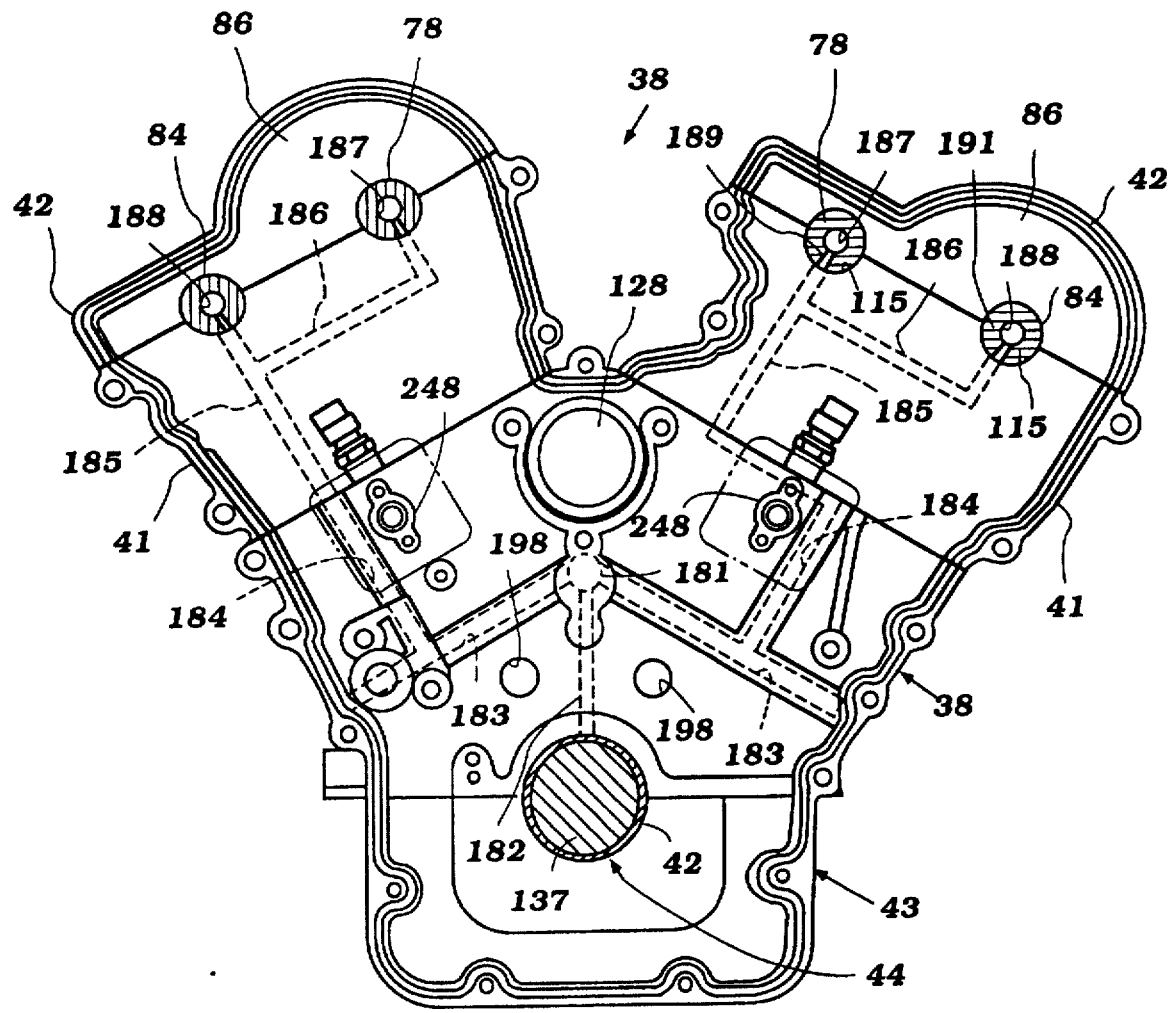
FIG. 9 is a top plan view looking in the same direction as FIGS. 2–6 and with a further removal of components, primarily the cam shaft drive, in order to illustrate the lubrication system for the engine.
Figure 10:
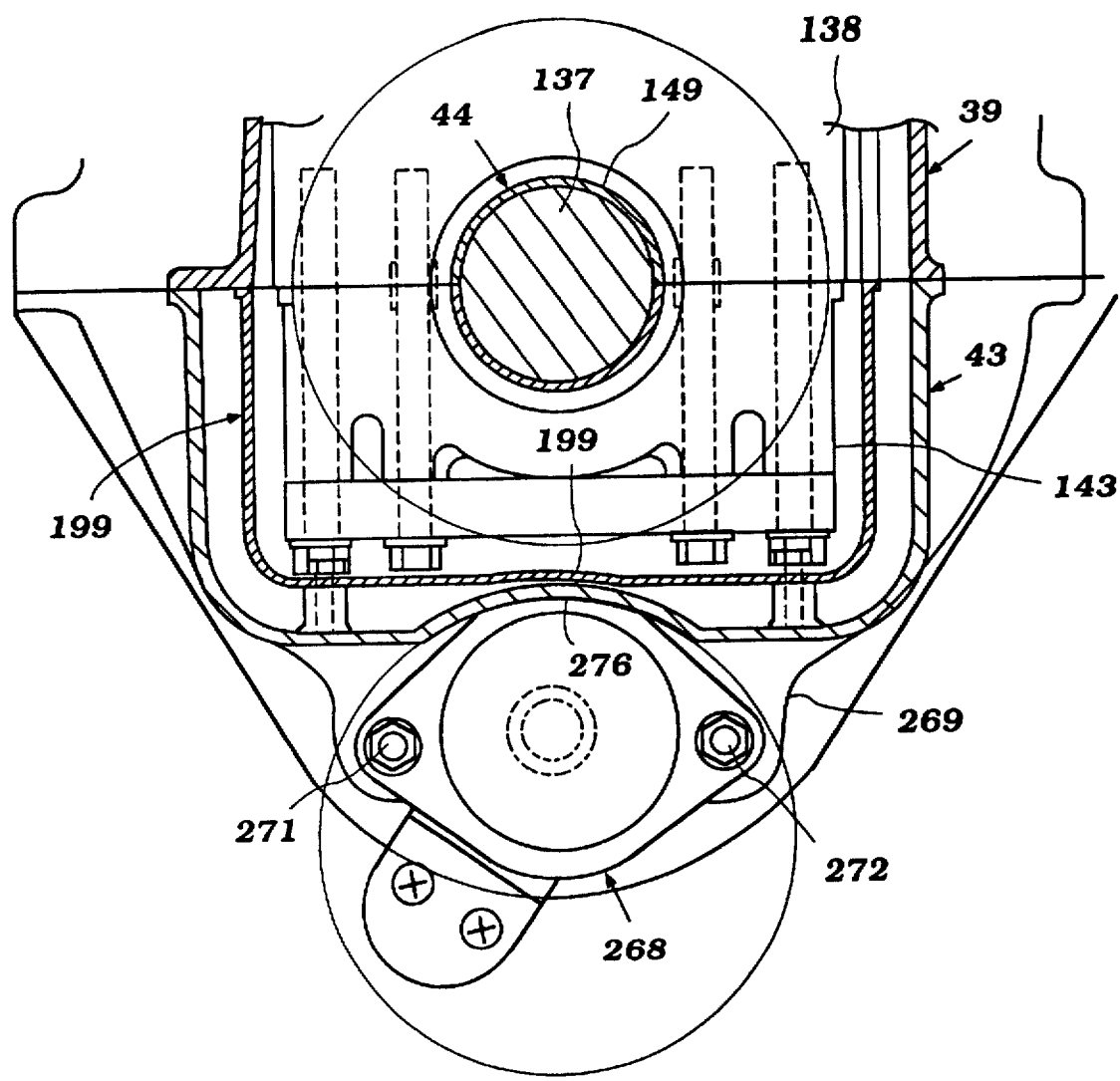
FIG. 10 is an enlarged top plan view of a portion of the engine looking again in the same direction as FIGS. 2–6 and 9 but with further enlargement and with other portions broken away so as to more clearly show the mounting arrangement for some of the components and certain components of the crankcase ventilating system.

The outlet side of the oil filter 178 communicates with a lubricant supply passage 179 which, in turn, communicates with a main oil gallery 181 formed in the cylinder block at the area on the lower end of the chamber 129 in which the idler shaft 128 is journaled. This main oil gallery 181 is shown in FIGS. 5, 9, and 12 and extends along the webs 138 where the main bearings 142 for the crankshaft 44 are positioned. Each of these webs is provided with a drilling 182 so that the lubricant under pressure an pass to the main bearings 142. These drillings extend in an upward direction from their discharge ends so as to provide a trap like effect to reduce the likelihood of reverse oil flow. This arrangement is shown best in FIG. 13 wherein it may be seen that the webs 138 have the oil supply passages 182 that communicate therewith for delivery to the bearings 142 and the corresponding journal surfaces 137 of the crankshaft 44. Hence, there is a copious supply of lubricant under pressure to the main bearings of the crankshaft. Any lubricant which seeps from this area will be returned back to the oil tank 147 through a return path which will be described later.

As may be best seen in FIG. 9, the upper face of the cylinder block 38 is formed with a pair of auxiliary galleries 183 which intersect the main oil gallery 181 and deliver oil to further passageways 184 that extend upwardly toward the cylinder heads 41 and which communicate at their upper ends with passages 185 which are drilled in the cylinder heads 41. The drilled passages 185 extend from their lower ends toward the cam shaft bearing surfaces 115 at this end of the cylinder head. A branch passage 186 is provided from the passageway 185 so that both the intake and exhaust cam shaft bearing surfaces 115 will be serviced.

The cam shafts 78 and 79 are provided with longitudinally drilled galleries 187 and 188, respectively that communicate with these passages 186 through cross drillings 189 and 191, respectively. Hence, oil can flow axially along the cam shaft 78 and 84 to exit paths that are disposed adjacent each of the bearing surfaces 115 for lubricating these bearing surfaces. Again, lubricant which passes in this area will be free to drain from a path which will now be described along with the remaining return paths for the lubricant.

As best seen in FIG. 14, the lubricant which seeps from the cam shaft bearing surfaces 115 can drain downwardly through each of the cylinder heads 41 to their lower ends. This lubricant will also pass over the valve tappets 71 and the guides which support the intake and exhaust valve 77 and 83 so as to lubricate these components. This oil flows as shown in the solid line arrows in this figure and can then pass through drain openings 192 formed in the lower end of the cylinder heads 41. These drain openings 192 communicate with corresponding drain openings 193 in the cylinder block and which open into a drain chamber 194 formed in the lower face of the cylinder block 39.

A drain passage 195 formed therein permits the lubricant to then pass downwardly in the area beneath the idler shaft chamber 129 as shown in FIG. 12 and to drain back into the oil tank 148. In this regard, it should be noted in reference to FIG. 12 that the oil supply line 176 leading to the oil filter has a pressure regulator valve 196 disposed at its lower end. Oil pressure is regulated by opening of this pressure regulator valve 196 and dumping excess oil back to the oil tank 147.

Lubricant that has entered the crankcase chamber in which the crankshaft 44 rotates also may drain down into the chamber 194 through a drain passage 197 formed in the lower end of the cylinder block end wall around the flywheel 161. Similar drain passages 198 are formed in the webs 138 so as to ensure that the oil that has passed through the engine will all return back to the oil tank 147.

The engine 38 is provided with a crankcase ventilating system in which an air flow through the crankcase chamber of the crankshaft and other internal components of the engine including the cam chambers 86 is permitted to circulate. Rather than using atmospheric air, and, in accordance modern emission standards, the blow-by gases that escape past the pistons 65 are utilized for this purpose. These gases circulate through the crankcase chamber 69 and other internal chambers of the engine and then are delivered to the induction system for further combustion so as to avoid unwanted emission of high amounts of hydrocarbons to the atmosphere.

This crankcase ventilation and emission control system appears in most detail in FIGS. 3, 5, and 10–13 and will now be described by particular reference to those figures. First, there is provided a baffle plate, indicated generally by the reference numeral 199 that is mounted in the crankcase chamber 69 and which is specifically mounted on bosses 201 of the crankcase member 43. As may be best seen in FIGS. 5, 10, and 12, this baffle plate 199 generally encircles the crankshaft 44 and will cause any oil which may seep past the main bearings 142 from being thrown against the crankcase member 43.

Rather, this seepage of oil will be thrown against the baffle plate 199 so that air can flow on both sides of the baffle plate as shown in the broken arrows and thus, prevent this liquid lubricant from mixing with the ventilating air. Rather, the lubricant will impinge on the baffle plate 199 and condense on this plate because of its lower temperature and because of the cooling air flow across it. This oil can then drain to the lower portion of the crankcase chamber and drain back to the oil reservoir 147 through the path previously described.

The wall that separates the crankcase chamber from the balance shaft chamber 129 is provided with a plurality of openings 202 which permit the ventilating air to flow through the chamber 129 and also to sweep any oil that may deposit in this chamber back toward the oil reservoir 147. These ventilating gases then can flow upwardly to the timing case chamber 136 formed at the front of the engine and moved to the upper portion and also circulate the cam shaft chambers 86.

The upper portion of the timing case cover 93 is provided with a pair of elevated portions 203 that have openings 204 that receive nipples 205. These nipples 205 are connected to a pair of flexible conduits 206 and 207 (FIG. 3) which then leads to the Y-pipe 99 of the intake manifold at an intermediate point 208 therein immediately downstream of the throttle body 91. Hence, this will provide a lower pressure discharge area that causes the crankcase ventilating gases to be drawn upwardly and out of the engine ventilating chambers and into the induction system. Thus, any hydrocarbons in these ventilating gases will be subject to the heating in the combustion chamber and will then further vaporize and be burned off so that they will not pollute the atmosphere.

The next portion of the engine 38 that will be described in detail is the exhaust manifolding system that delivers the exhaust gases from the cylinder head exhaust passages 81 through the hub underwater exhaust gas discharge or other exhaust gas discharge system for the outboard motor 31. This system is shown best in FIGS. 4, 5, and 16–21. Before describing this system in detail, it should be noted that in conventional outboard motor practice, the exhaust manifold is generally formed integrally within the cylinder block and/or cylinder heads. The exhaust system is another area where the design of internal combustion engines must be particularly adapted for outboard motor application. Unlike other types of engine applications, the space and length available for the exhaust system of an outboard motor is extremely limited. Therefore, a large portion of the silencing of the exhaust gases is accomplished by cooling of the exhaust gases.

Thus, it has been the practice to form the exhaust manifolds in the cylinder block and/or cylinder heads, as noted above, so that the engine cooling jacket may additionally cool the exhaust gases to assist in silencing and to maintain heat control. However, these types of arrangements, particularly with larger displacement and larger power engines, tend to be somewhat counterproductive. That is, the heat from the exhaust system actually tends to cause the engine to run hotter than desired and adequate cooling is not provided.

Figure 18:
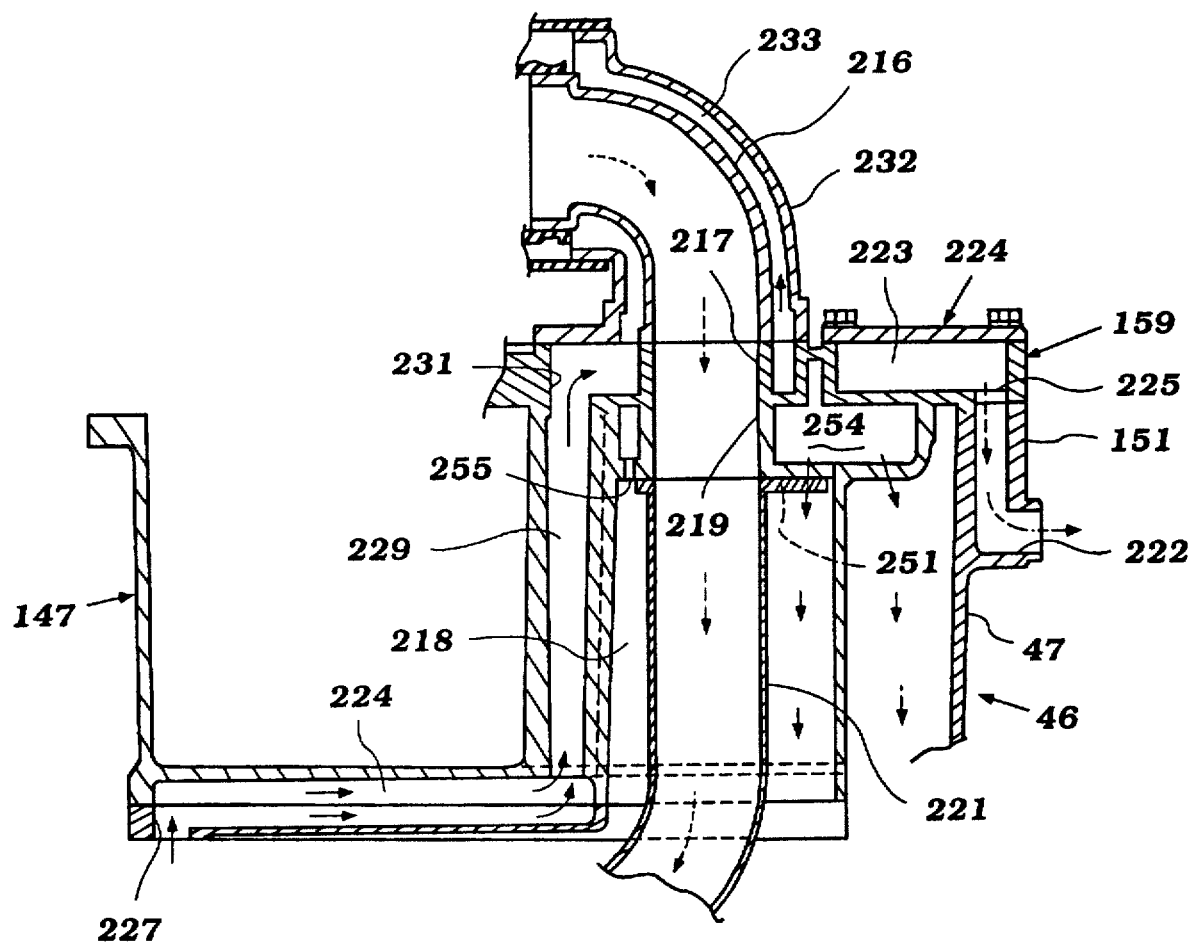
FIG. 18 is a cross-sectional view taken along the line 18—18 of FIG. 17, and shows the relationship of the coolant exhaust flow and lubricating system of the engine.
Figure 19:
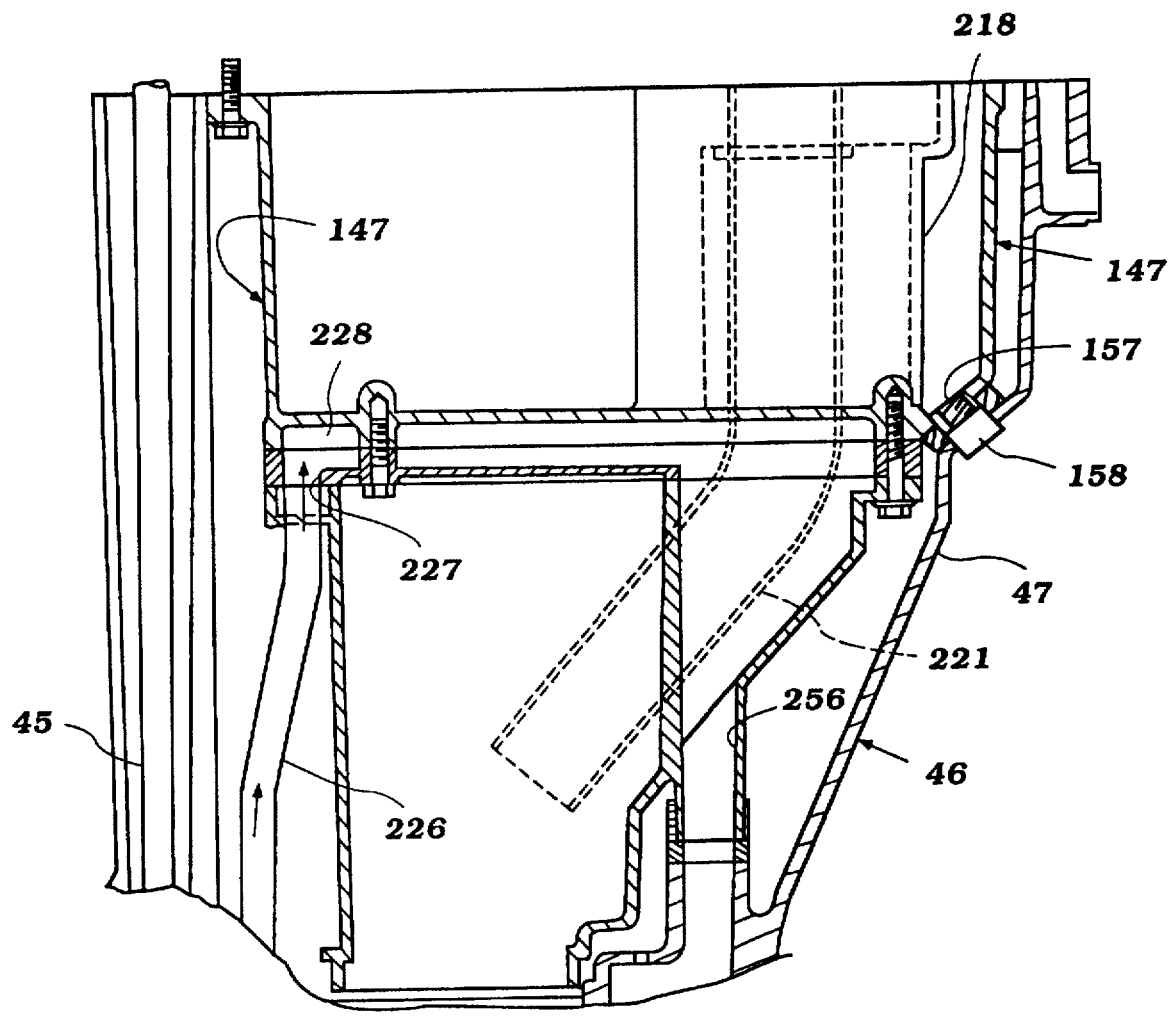
FIG. 19 is a cross-sectional view taken along a plane parallel to the plane of FIG. 18, and shows the lubricant drain system, as well as the relationship of components of the exhaust system.

Therefore, the exhaust manifolds 82, aforereferred to, are formed externally of the cylinder heads 41 and cylinder block 39. These exhaust manifolds have flange portions 209 (FIG. 20) which are connected by threaded fasteners 211 (FIG. 4) to the sides of the cylinder heads 41. The manifolds 82 runners extend transversely outwardly and are connected to inner tubular parts 212 that extend generally in a downward direction toward the lower end of the engine. These lower portions then curve inwardly to form right angled portions 213 (FIG. 21) that face toward each other. These portions are connected by means of a flexible hose 214 and hose clamps 215 to a pair of right angle exhaust conduits 216 that curve downwardly and which are affixed as seen in FIG. 18 to the upper ends of the exhaust guide 150. The exhaust passages formed by the sections 216 are in communication with exhaust passages 217 formed on opposite sides of the exhaust guide 150 and on opposite sides of a rearwardly extending portion 218 of the oil tank 147.

By way of this construction, the oil tank 147 can be of a large volume and also still be protected from the heat transfer from the exhaust system. This area of the oil tank, that is the area 218, is where the drain opening 157 and drain plug 158 are positioned.

A further exhaust passage 219 is formed in the lower portion 151 of the exhaust guide 150 and exhaust pipes 221 are affixed to the underside of this portion so as to receive the exhaust gases and deliver them to an expansion chamber-type silencing device which is formed in the drive shaft housing 46.

From this expansion chamber device, the exhaust gases may be discharged to the atmosphere through a known type of high-speed underwater exhaust gas discharge. This may include a through the hub propeller discharge. In addition, the exhaust system may also be provided with an above-the-water low-speed exhaust gas discharge port, indicated generally by the reference numeral 222 (FIG. 18) which is formed to the rear of the drive shaft housing 46. Exhaust gases flow from the aforenoted expansion chamber into a further expansion chamber 223 formed in the upper guide plate 159 and which is closed by a cover plate 224 and then downwardly through a restricted opening 225 for discharge through the low-speed exhaust gas discharge 222.

As is known in the outboard motor art, under high-speed operation the underwater exhaust gas discharge is relatively shallowly submerged and the exhaust gases can easily exit. However, as the watercraft 32 is traveling slower this underwater discharge will become very deeply submerged. This coupled with the low exhaust gas pressures will cause the exhaust gases to exit through low-speed, above-the-water exhaust gas discharge 222. The expansion chamber 223 coupled with the silencing system in the drive shaft housing and lower unit will facilitate in the silencing of these exhaust gases.

The cooling system for the engine 38 and its related auxiliaries including the exhaust system will now be described by particular reference to FIGS. 5, 9, and 14–21. This cooling system includes a cooling arrangement for the exhaust system which has just been described. It will be noted that many of the exhaust conduits which have already been described are encircled by outer tubular members to provide additional cooling jackets and these will be described as a part of the following description.

As is typical without outboard motor practice, cooling water for the engine 38 and for its auxiliaries is drawn from the body of water in which the watercraft is operating. To this end, the lower unit 49 is provided with a water inlet opening which is not shown and which communicates through a conduit with a water pump that is driven off of the drive shaft 45 at an area adjacent where the drive shaft housing 46 and lower unit 49 merge. Since this type of construction is well known in the art, a detailed description of it is not believed to be necessary to permit those skilled in the art to practice the invention since any known type of water pump and drive may be utilized.

This cooling water is then delivered by the water pump upwardly toward the power head through a water delivery conduit 226 (FIG. 19) to an inlet opening 227 formed in the underside of the oil tank 147. This cooling water inlet opening 227 merges with a pair of angularly-related passages 228 which extend along the lower side of the oil tank 147 and thus provide initial cooling for the oil for the engine.

These passages 228 diverge and end in a pair of outlet ports 229 formed in the upper end of the body 146 which forms the oil tank 147. Thus, the further passages 229 are in proximity to the oil tank 147 and provide additional cooling for the oil therein.

Each of the passages 229 terminates at its upper end in a cooling jacket 231 which encircles the exhaust opening 217 in the exhaust guide or spacer plate 159. Thus, after first cooling the oil, the cooling water engages and encircles the exhaust system for cooling it.

The connecting angle pipes 216 of the exhaust system are provided with outer tubular portions 232 that define a water jacket 233 therebetween which is in open communication with the cooling jackets 231 of the guide plate 159.

Figure 21:
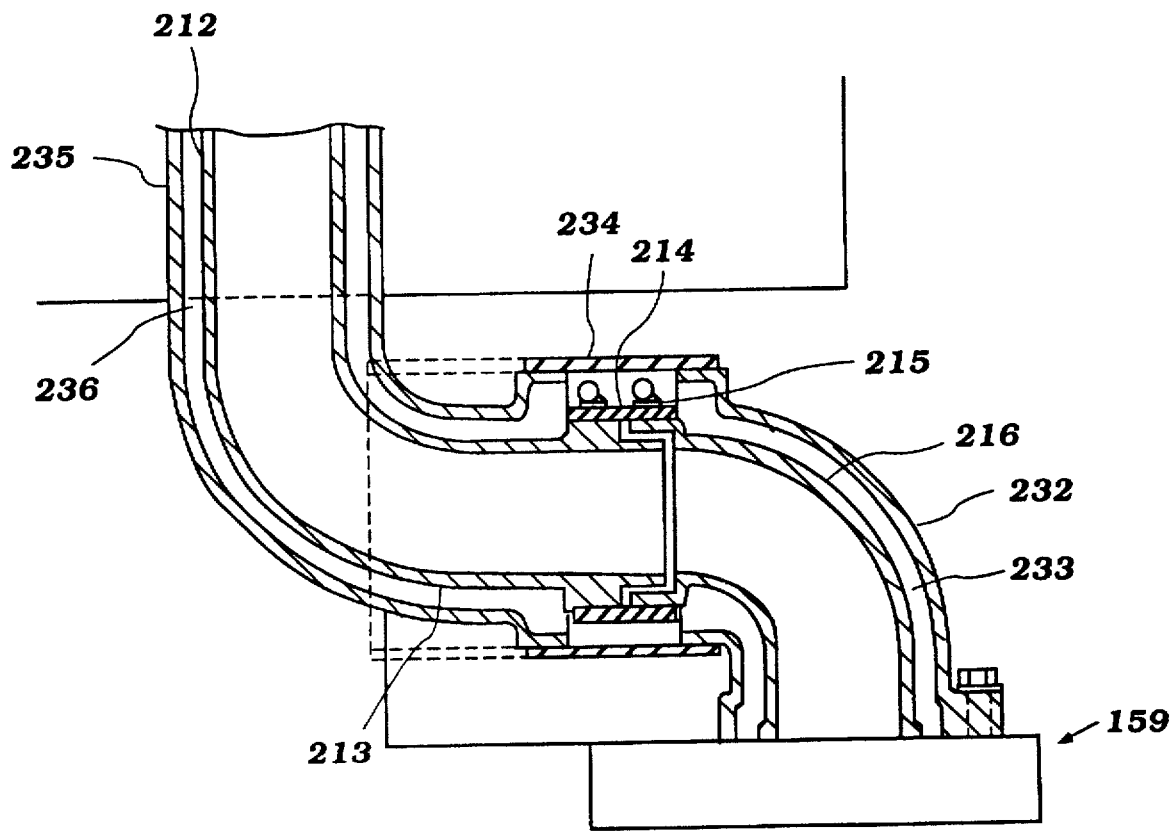
FIG. 21 is a cross-sectional view taken generally along the line 21—21 of FIG. 20.

Referring now to FIG. 21, it will be seen that the cooling jackets 233 which encircle the angle pipes 216 communicate with a further sealed joint 234 which encircles the coupling 214 between the exhaust manifold outlets 213 and the inlet ends of the angle pipes 216.

Like the angle pipes 216, the exhaust manifold 213 is provided with an outer shell 235 which forms a cooling jacket 236 around the exhaust manifolds 212. This cooling jacket 236 encircles the individual runners of the exhaust manifold 82 and specifically its inner shell 212 and then exits through exit openings 237 formed at the upper end of each exhaust manifold 82.

Figure 20:
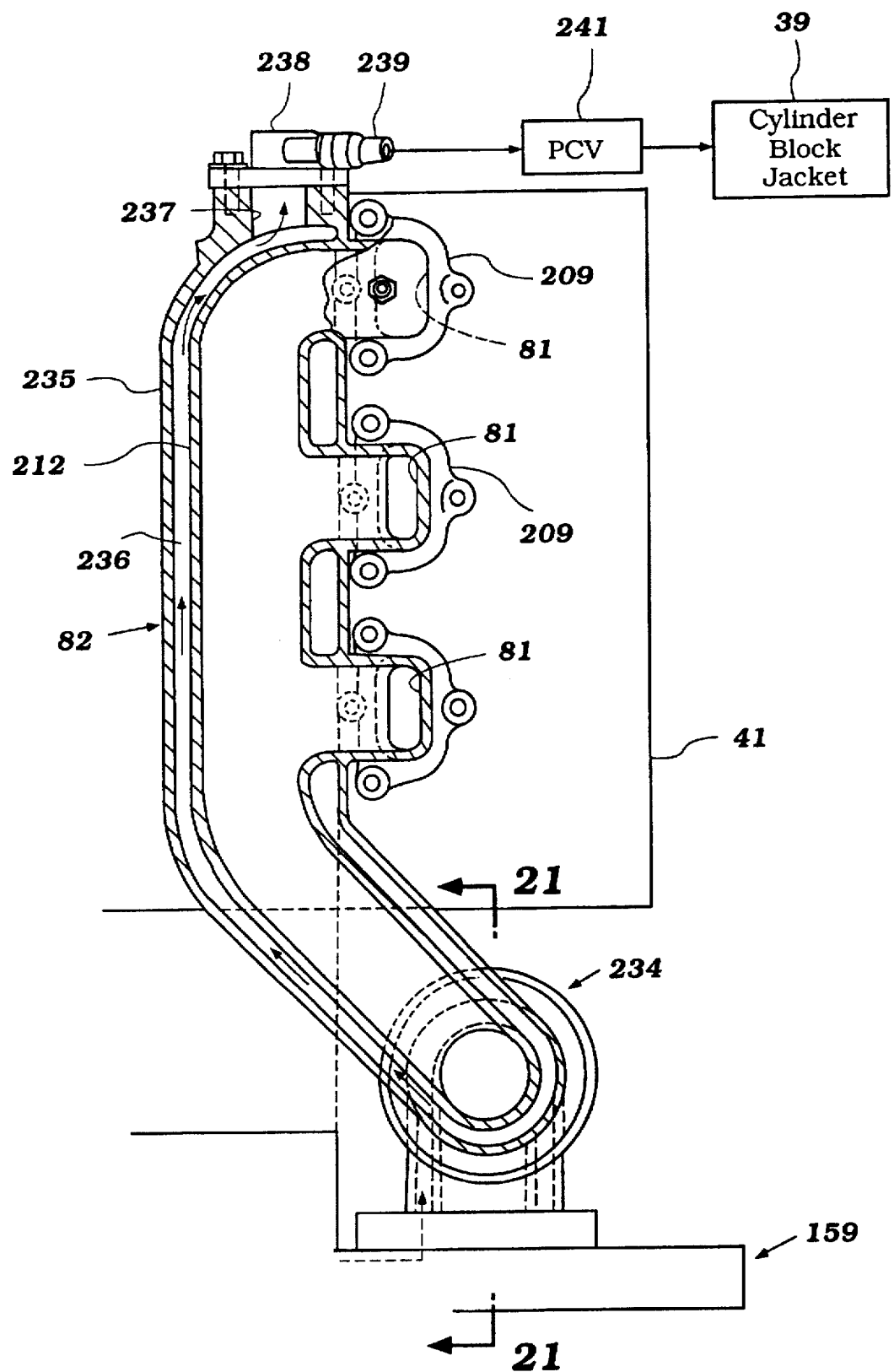
FIG. 20 is a side elevational view, looking generally in the same direction as FIG. 7, but on a larger scale and with a portion of the exhaust manifold broken away to more clearly show the relationship of the cooling system to the exhaust manifold.

A water outlet fitting 238 is affixed to the upper end of each manifold 82 and has an outlet nipple 239 which communicates through a pressure responsive valve 241 to the cooling jacket of the cylinder block 39 as shown schematically in FIG. 20.

As may be seen best in FIGS. 5 and 14, the cylinder block 39 is formed with cooling jackets 242 which encircle the respective cylinder bores 63. In a similar manner, the cylinder head is formed with cooling jackets 243. The cylinder head cooling jackets 243 communicate with the cylinder block cooling jackets 249 and specifically with an inlet water gallery 244 formed therein. The cylinder head cooling jacket flow is indicated by the arrows 245 in FIG. 14 while the cylinder block cooling jacket flow is indicated by the arrows 246. The water which has circulated through the portion of the exhaust system as thus far described is returned by the pressure responsive valve 241 to inlet openings 247 formed in the lower face of the cylinder block 39 and which communicates with the water gallery 244. The water then flows through the paths 245 and 246 through a return area 247 formed in the upper end of each cylinder block. A water discharge fitting 248 is formed internally in the cylinder block and extends through the cam cover 93 where it is connected to a thermostatic valve 249 on each side of the engine. The thermostatic valves 249 control the flow of coolant through the engine, as is well known in this art.

Each thermostatic valve 249 communicates with a respective flexible conduit 251 which then returns the water from the respective bank of the engine 38 (it being noted that each bank has in essence its own cooling system) to respective water return passages 252 formed in the flywheel cover and guide plate 159, as seen in FIG. 15.

These passages 252 communicate with water return passages 253 formed in the lower surface of the guide member 159 and which communicate with water jackets 254 that encircle the attachment end of the exhaust pipes 252 so as to provide cooling around them as best seen in FIG. 18.

Figure 16:
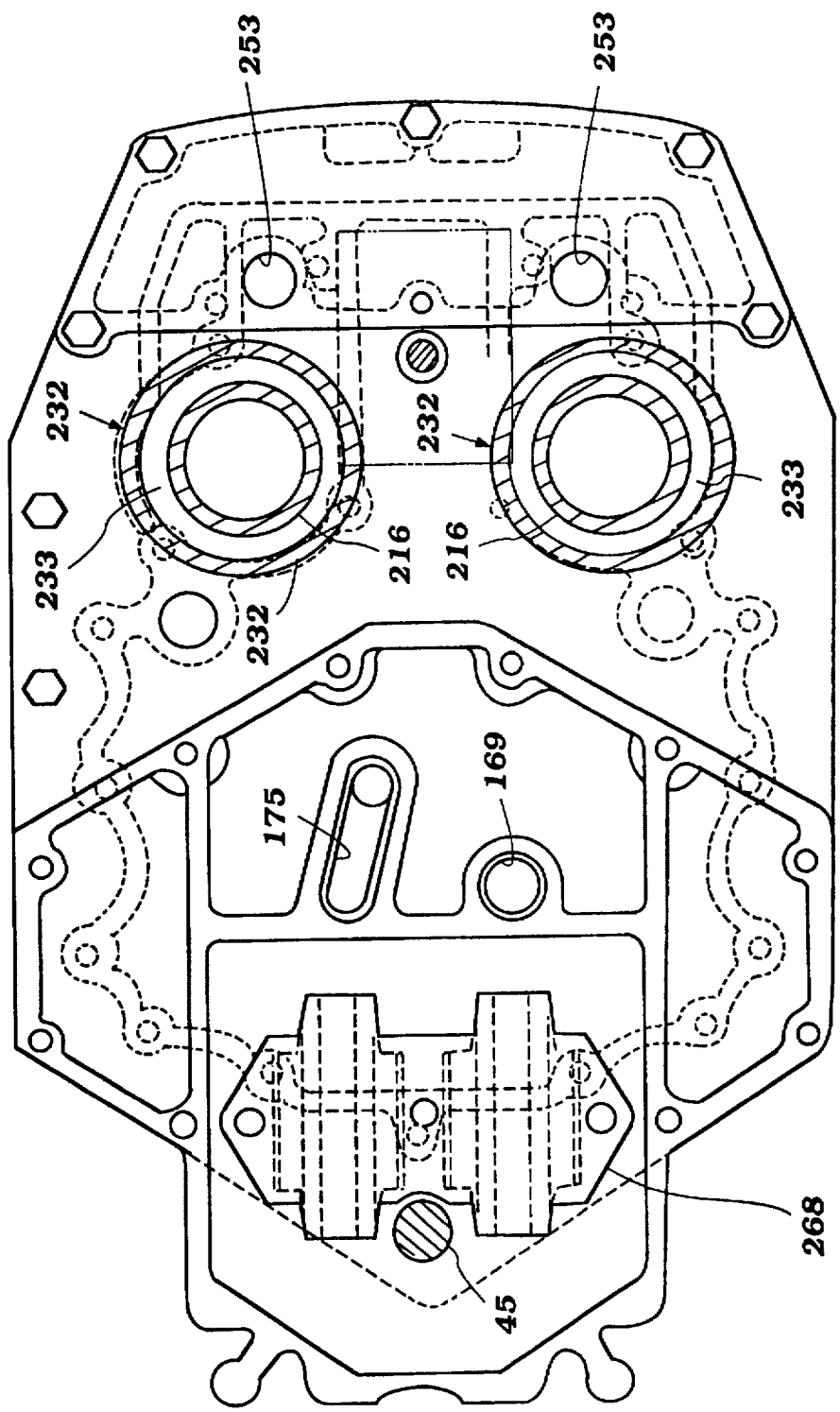
FIG. 16 is an enlarged cross-sectional view taken along the line 16—16 of FIG. 12, and shows the relationship of the steering shaft attachment and the exhaust and water passages for the engine.
Figure 17:
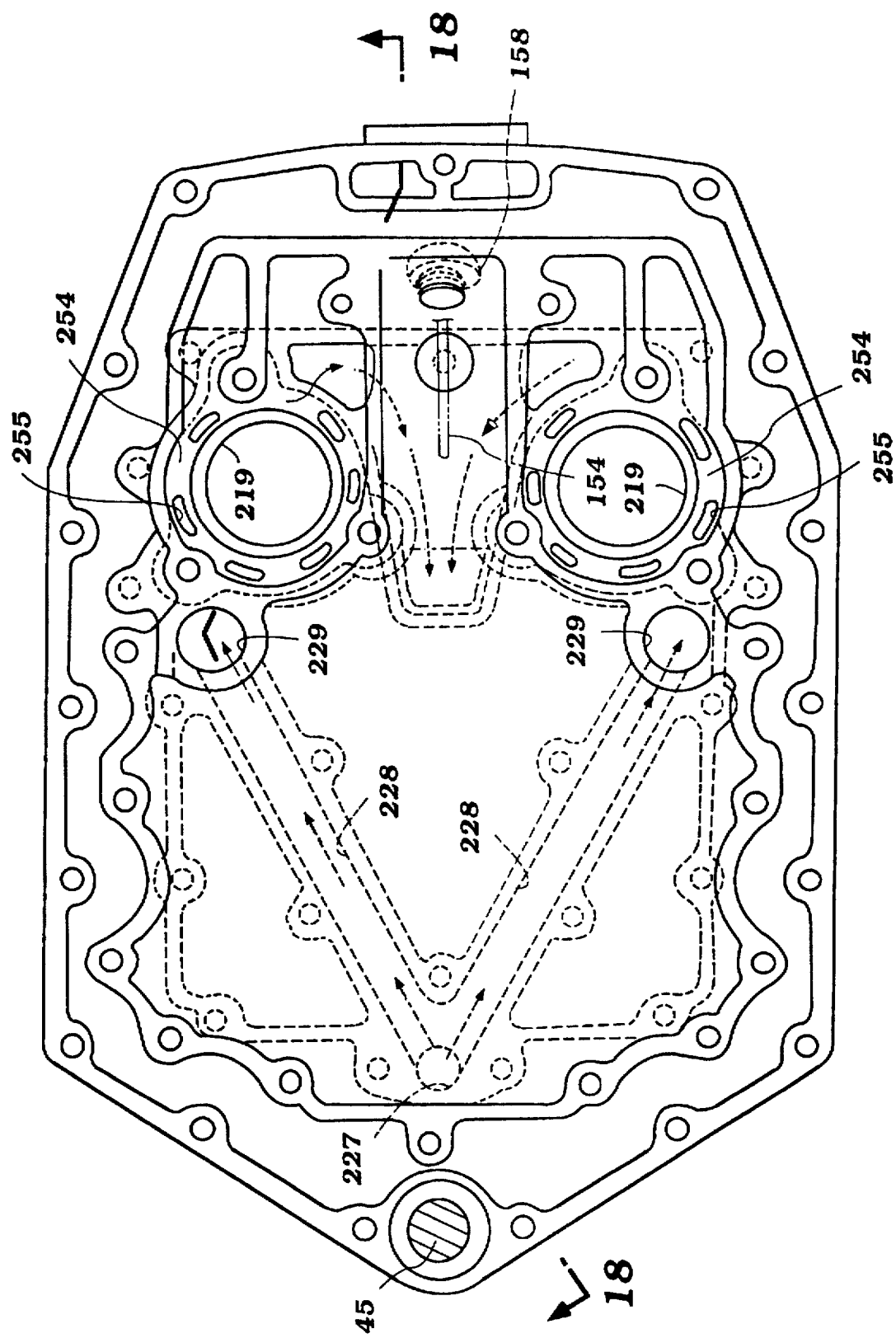
FIG. 17 is an enlarged cross-sectional view taken along the line 17—17 of FIG. 12 and shows the relationship of the exhaust system to the oil reservoir for the engine.

The cooling jackets 254 are provided with a plurality of slotted openings 255 as shown in FIGS. 16 and 17 which permit the spent cooling water to flow into the area 218 around the exhaust pipes 221 and cool them. In addition, this cooling flow of water further assists in cooling the oil tank 147 and reduces the likelihood of heat transmission from the exhaust system to the lubricating system.

This cooling water then drains through drain passages 256 (FIG. 19) so as to flow out of the lower unit through a suitable return opening. This water may at some lower point be mixed with the exhaust gases to further assist in their silencing and cooling.

From the description of the cooling system it should be readily apparent that the cooler water from the body of water in which the watercraft is operated is first delivered to the exhaust manifolds for their cooling and then is transferred to the engine cooling jackets and subsequently returned in proximity to the exhaust system for further cooling. This system provides not only effective cooling, but also will ensure that the engine reaches its operating temperature sooner. That is, on engine startup the exhaust gases will obviously be the warmest part of the engine, and hence the early contact of the cooling water with the exhaust system will cause it to be heated, and this heat is then transferred to the engine for improved warm-up.

Finally, there will be described certain accessories that are related to the engine and which cooperate with it in a manner which will be described. Referring first to FIGS. 7 and 12, it has been noted that the engine is provided with the flywheel 161. The flywheel 161 has affixed to it a starter gear 258. A starter motor 259 is mounted on the front lower portion of the engine, and specifically on an extension 261 of the crankcase member 43 and in a recessed area 262 thereof so as to provide a compact construction. The starter motor has a starter shaft to which a pinion gear 263 is affixed for cooperation with the flywheel starter gear 258 for starting of the engine. A starter solenoid 264 is mounted in proximity to the starter motor 259 and is operated by a known type of starter control circuit.

It should be noted that the flywheel 161 and the starter gears 258 and 263 are mounted within a cavity 265 formed by the upper guide plate 159, cylinder block 39, and crankcase member 43. A vent tube 266 is provided so as to balance the air pressure in the chamber 263. This vent tube 266 has a siphon-type shape so as to reduce the likelihood of water entry into the flywheel chamber 265. In addition, a drain pipe 267 can drain any accumulated water from the flywheel chamber back to the atmosphere.

It has been previously noted also that the steering shaft is connected to the drive shaft housing by the upper bracket 55. This connection appears in FIGS. 12 and 16, wherein the connecting member is indicated generally by the reference numeral 268. This connecting member 268 includes a suitable resilient coupling so as to reduce the transmission of vibrations to the occupants of the watercraft 32.

As may be best seen in FIGS. 3, 5–7, 10, and 12, a further engine accessory, namely an alternator or generator 268, is mounted at the front of the engine 38 and above the starter motor 259. To this end, a mounting bracket 269 is affixed to the crankcase member 43 at the upper end of the engine by threaded fasteners. This mounting bracket 269 provides connections 271 and 272 to the alternator 268 that permit it to be adjusted. The alternator 258 is provided with a pulley 273, which is driven by a drive belt 274 from a pulley 275 affixed to the upper end of the crankshaft 44. The adjustment fasteners 271 and 272 permit the tension of the belt 274 to be adjusted in a manner well known in the art.

It should be noted that the crankcase member 243 is formed with a recess 276 so as to permit a more compact assembly.

The alternator or generator 268 supplies electrical power not only to the engine for its operation and control, but also may supply electrical power for charging one or more batteries (not shown) provided in the watercraft hull 32 and also electrical accessories of the watercraft.

Figure 4:
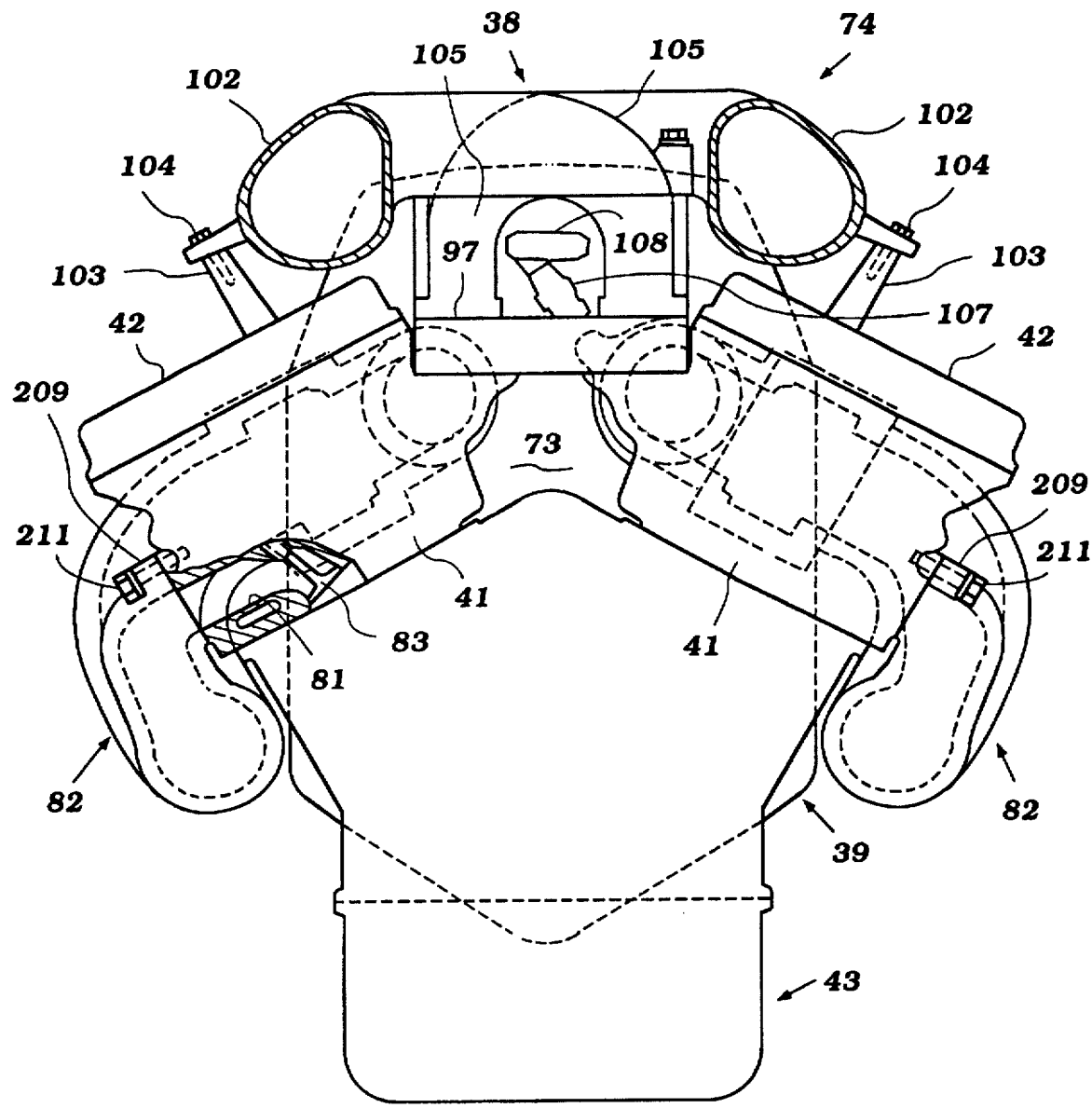
FIG. 4 is a view looking in the same direction as FIG. 3 but only showing the main engine body and with certain portions broken away and other portions shown in section.

The engine controls may be conveniently mounted in the protective cowling 36 in a manner as shown in FIG. 4, wherein they will be protected from heat. It will be seen that each of the plenum chambers 102 is provided with respective bosses 281 on which a mounting plate 282 is affixed.

The mounting plate 282 mounts one or more control boxes 283 which may include, among other things, the ignition system for firing the spark plugs of the engine. Also, any ECU for the engine may also be controlled by a control unit mounted on the mounting plate 282. This thus provides not only a compact assembly, but also in which the components can be mounted in a way so as to be isolated from the heat of the engine 38. Furthermore, this mounting places the electrical components in a location where they can be easily serviced.

Figure 22:
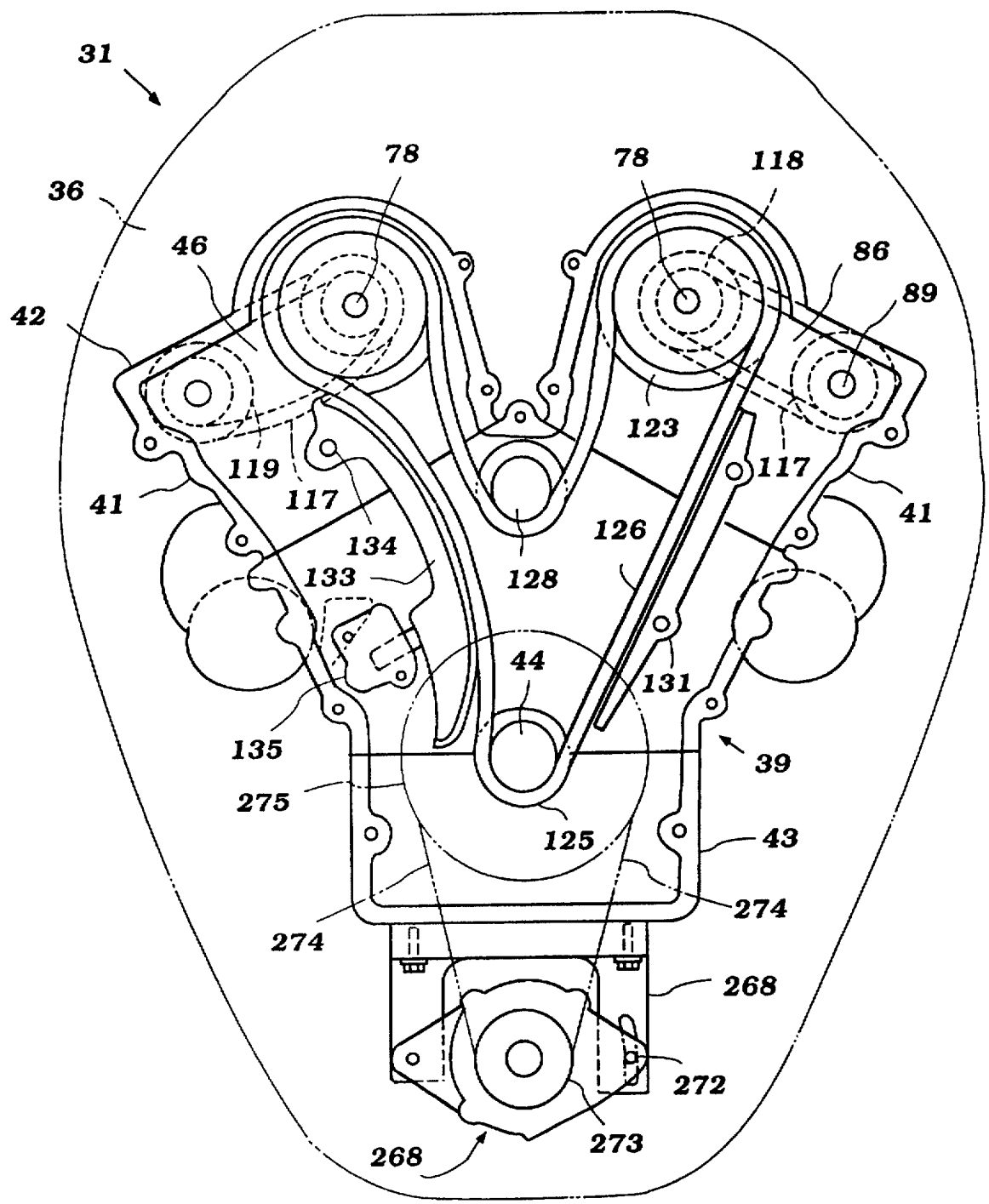
FIG. 22 is a top plan view, in part similar to FIG. 6, and shows another embodiment of the invention dealing with the camshaft drive mechanism.

In the embodiment of the invention thus far described, the drive mechanism for the camshaft has driven the exhaust camshaft 84 of one cylinder bank directly from the crankshaft 44 and the intake camshaft 78 of the other bank directly from the camshaft 44, as shown in FIG. 6. FIG. 22 shows another embodiment which is generally the same as this embodiment, but wherein both of the intake camshafts are driven directly by the crankshaft. Like the previous embodiment, the remaining camshaft for each cylinder head 41 is driven by a flexible transmitter 117 from the crankshaft-driven camshaft. Since this embodiment is the same except for that distinction, further description of this embodiment is not believed to be necessary, and the same reference numerals have been utilized to identify the same or similar components.

Figure 23:
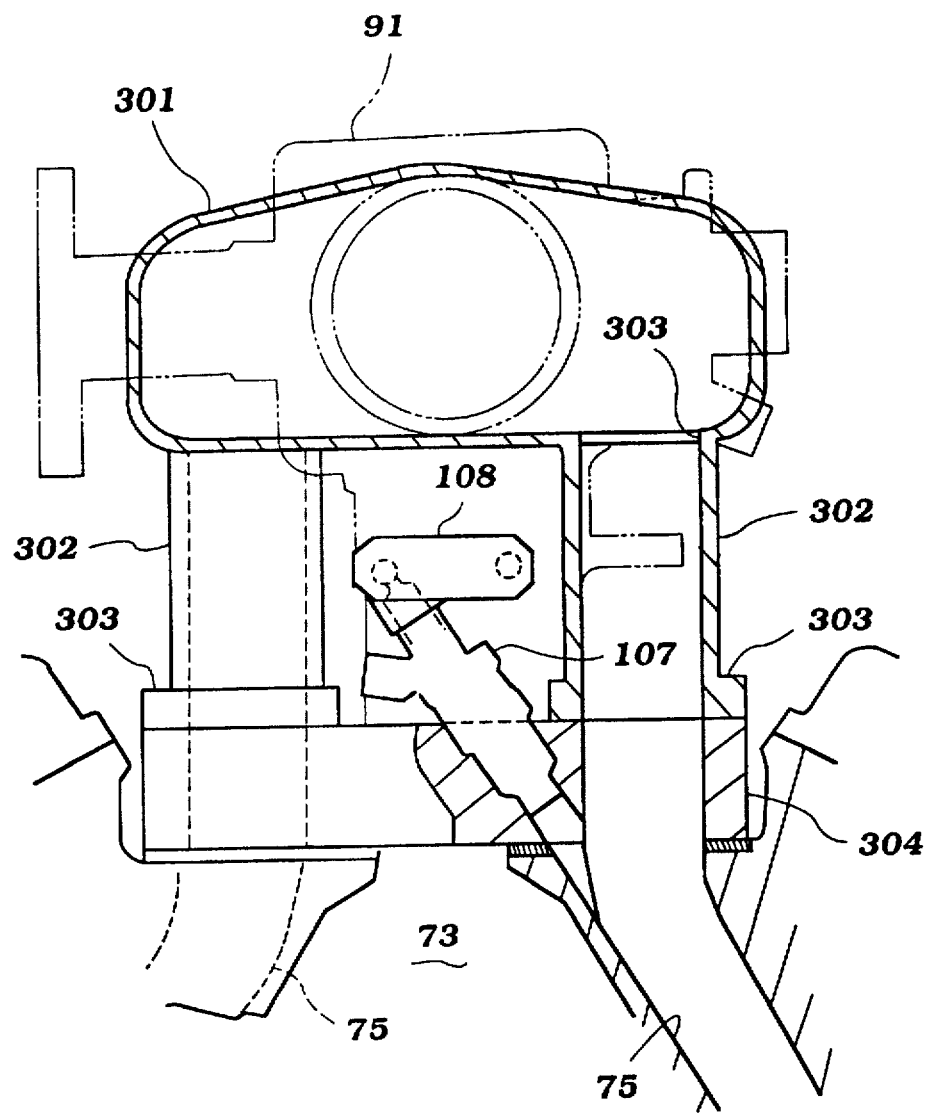
FIG. 23 is a view, in part similar to FIG. 4, but on a larger scale, and with a different portion broken away showing an induction system in accordance with another embodiment of the invention.

In conjunction with the embodiment thus far described, the engine has been provided with an induction system that incorporates two separate plenum chambers, one over each cylinder bank and which serves the cylinders of the opposing cylinder bank. This type of arrangement provides a relatively large plenum chamber volume, and also permits the use of relatively long runners extending from the plenum chamber to the served cylinders. Such relationships are useful in providing good tuning for mid-range performance. FIG. 23 shows another embodiment which differs from the embodiment thus far described only in the configuration of the plenum chamber and the associated intake manifolding arrangement. For this reason, only those components which differ from those of the previously described embodiment are illustrated and will be described. Also, because of the general similarity to the previously described embodiment, only a single figure is believed necessary to permit those skilled in the art to understand the construction and operation of this embodiment.

Basically, the illustration of FIG. 23 should be compared with FIGS. 4 and 5 of the previously described embodiment. In this embodiment it will be seen that a single relatively wide and long plenum chamber 301 is disposed in the area above the valley 73 between the cylinder banks. The throttle body assembly 91 serves this plenum chamber 301 at one end thereof.

Individual manifold pipes 302 extend from outlet openings 303 formed in the forward or lower wall of the plenum chamber 301 and terminate in flanges 303. The flanges 303 are connected to a manifold plate 304, as with the plate 97 of the previous embodiment. The fuel injectors 107 and fuel rail 108 are mounted on this plate 304, and thus their relationship to the inlet passages 75 of the cylinder heads 41 is as previously described. Thus, it should be seen that this embodiment provides a relatively large plenum chamber volume that serves the individual cylinders through relatively short runners. This type of configuration is best suited for high-end performance.

Thus, from the foregoing description, it should be readily apparent that the described embodiments of the invention provide a very effective four-cycle engine powered outboard motor. The oil reservoir for the engine is disposed in the drive shaft housing and the ventilating and return systems for the lubricating system facilitate return of oil to the oil reservoir and also facilitate discharge of ventilating gases from the upper portion of the engine. The oil level can be easily checked and a baffle plate is arranged in the crankcase so as to minimize the amount of splash lubricant that can pass through the ventilating gases to the atmosphere. Of course, the foregoing description is that of the preferred embodiments of the invention, and various changes and modifications may be made without departing from the spirit and scope of the invention, as defined by the appended claims.

What is claimed is:

1. An outboard motor comprised of a powerhead consisting of a four-cycle internal combustion engine and a surrounding protective cowling, said engine including a cylinder block having at least one horizontally disposed cylinder bore with a crankcase chamber formed at one end thereof, a crankshaft journaled for rotation about a vertically extending axis in said crankcase chamber, a drive shaft housing and lower unit depending from said powerhead and journaling a drive shaft for rotation about a vertical axis and including a propulsion device driven by said drive shaft for propelling associated watercraft, means for coupling said crankshaft for rotation with said drive shaft for driving said drive shaft from said crankshaft, an oil reservoir for containing lubricant for said engine disposed beneath said engine and at least in part in said drive shaft housing and lower unit, a cylinder head affixed to said cylinder block enclosing the end of said cylinder bore opposite said crankcase chamber, a camshaft journaled for rotation by said cylinder head within a cam chamber formed therein about a vertically extending axis, a timing drive at the upper end of said engine for driving said camshaft in timed relationship from said crankshaft, a timing cover affixed to the upper end of said cylinder block and said cylinder head and enclosing said timing drive, said crankcase chamber and said camshaft chamber communicating with said timing case, and a ventilating gas outlet formed in said timing case for discharging ventilating gases from said crankcase chamber and said cam chamber.

2. An outboard motor as set forth in claim 1, wherein a pair of cam shafts are journalled in the cylinder head.

3. An outboard motor as set forth in claim 2, wherein the timing drive drives one of the camshafts directly from the crankshaft and the other camshaft is driven directly from the crankshaft driven camshaft.

4. An outboard motor as set forth in claim 2, wherein the cylinder block has a pair of angularly disposed cylinder banks each of which is formed with at least one cylinder bore with a valley formed between said cylinder banks, there being a pair of camshafts journalled in each of said cylinder heads.

5. An outboard motor as set forth in claim 4, wherein the timing drive drives one of the camshafts of each cylinder head directly from the crankshaft and the other camshaft of each cylinder head is driven directly from the crankshaft driven camshaft.

6. An outboard motor as set forth in claim 1, wherein the engine is provided with an induction system and the ventilating gas outlet communicates with said induction system.

7. An outboard motor as set forth in claim 6, wherein the cylinder block has a pair of angularly disposed cylinder banks each of which is formed with at least one cylinder bore with a valley formed between said cylinder banks, there being a pair of camshafts journalled in each of said cylinder heads, each cylinder head being provided with a respective ventilating gas outlet.

8. An outboard motor as set forth in claim 7, wherein the timing drive drives one of the camshafts of each cylinder head directly from the crankshaft and the other camshaft of each cylinder head is driven directly from the crankshaft driven camshaft.

9. An outboard motor as set forth in claim 1, wherein the oil reservoir has a portion extending laterally beyond the engine and has a fill and dipstick receiving opening formed therein for adding lubricant to said oil reservoir and for checking the lubricant level therein.

10. An outboard motor as set forth in claim 1, wherein a return path is formed in the cylinder block in aligned vertical relationship with the oil reservoir for draining oil from the engine to said oil reservoir by gravity, and a fill and dipstick receiving opening is formed in the upper end of said engine and communicating with said return passage for permitting filling of said oil reservoir and checking of the lubricant level therein.

11. An outboard motor as set forth in claim 1, wherein, a baffle plate is fixed to the engine within the crankcase chamber in close proximity to the crankshaft, said baffle plate being spaced from a crankcase member forming in part the crankcase chamber and defining a ventilating air flow path on both sides thereof for permitting ventilating flow through said crankcase chamber while preventing lubricant from becoming entrained in the ventilating flow.

12. An outboard motor as set forth in claim 11, wherein a pair of cam shafts are journalled in the cylinder head.

13. An outboard motor as set forth in claim 12, wherein the timing drive drives one of the camshafts directly from the crankshaft and the other camshaft is driven directly from the crankshaft driven camshaft.

14. An outboard motor as set forth in claim 12, wherein the cylinder block has a pair of angularly disposed cylinder banks each of which is formed with at least one cylinder bore with a valley formed between said cylinder banks, there being a pair of camshafts journalled in each of said cylinder heads.

15. An outboard motor as set forth in claim 14, wherein the timing drive drives one of the camshafts of each cylinder head directly from the crankshaft and the other camshaft of each cylinder head is driven directly from the crankshaft driven camshaft.

16. An outboard motor as set forth in claim 11, wherein the engine is provided with an induction system and the ventilating gas outlet communicates with said induction system.

17. An outboard motor as set forth in claim 16, wherein the cylinder block has a pair of angularly disposed cylinder banks each of which is formed with at least one cylinder bore with a valley formed between said cylinder banks, there being a pair of camshafts journalled in each of said cylinder heads, each cylinder head being provided with a respective ventilating gas outlet.

18. An outboard motor as set forth in claim 17, wherein the timing drive drives one of the camshafts of each cylinder head directly from the crankshaft and the other camshaft of each cylinder head is driven directly from the crankshaft driven camshaft.

19. An outboard motor comprised of a powerhead consisting of a four-cycle internal combustion engine and a surrounding protective cowling, said engine including a cylinder block having at least one horizontally disposed cylinder bore with a crankcase chamber formed at one end thereof, a crankshaft journaled for rotation about a vertically extending axis in said crankcase chamber, a drive shaft housing and lower unit depending from said powerhead and journaling a drive shaft for rotation about a vertical axis and including a propulsion device driven by said drive shaft for propelling associated watercraft, means for coupling said crankshaft for rotation with said drive shaft for driving said drive shaft from said crankshaft, an oil reservoir for containing lubricant for said engine disposed beneath said engine and at least in part in said drive shaft housing and lower unit, said oil reservoir having a portion extending laterally beyond said engine and having a fill and dipstick receiving opening formed therein for adding lubricant to said oil reservoir and for checking the lubricant level therein.

20. An outboard motor comprised of a powerhead consisting of a four-cycle internal combustion engine and a surrounding protective cowling, said engine including a cylinder block having at least one horizontally disposed cylinder bore with a crankcase chamber formed at one end thereof, a crankshaft journaled for rotation about a vertically extending axis in said crankcase chamber, a drive shaft housing and lower unit depending from said powerhead and journaling a drive shaft for rotation about a vertical axis and including a propulsion device driven by said drive shaft for propelling associated watercraft, means for coupling said crankshaft for rotation with said drive shaft for driving said drive shaft from said crankshaft, an oil reservoir for containing lubricant for said engine disposed beneath said engine and at least in part in said drive shaft housing and lower unit, a baffle plate fixed to said engine within said crankcase chamber in close proximity to said crankshaft, said baffle plate being spaced from said crankcase member and defining a ventilating air flow path on both sides thereof for permitting ventilating flow through said crankcase chamber while preventing lubricant from becoming entrained in the ventilating flow.

21. An outboard motor comprised of a powerhead consisting of a four-cycle internal combustion engine and a surrounding protective cowling, said engine including a cylinder block having at least one horizontally disposed cylinder bore with a crankcase chamber formed at one end thereof, a crankshaft journaled for rotation about a vertically extending axis in said crankcase chamber, a drive shaft housing and lower unit depending from said powerhead and journaling a drive shaft for rotation about a vertical axis and including a propulsion device driven by said drive shaft for propelling associated watercraft, means for coupling said crankshaft for rotation with said drive shaft for driving said drive shaft from said crankshaft, an oil reservoir for containing lubricant for said engine disposed beneath said engine and at least in part in said drive shaft housing and lower unit, a return path formed in said cylinder block in aligned vertical relationship with said oil reservoir for draining oil from said engine to said oil reservoir by gravity, and a fill and dipstick receiving opening formed in the upper end of said engine and communicating with said return passage for permitting filling of said oil reservoir and checking of the lubricant level therein.

* * * * *